United States Patent
Johnson et al.

(10) Patent No.: US 12,145,094 B2
(45) Date of Patent: *Nov. 19, 2024

(54) FILTER ELEMENT HAVING INNER SUPPORT AND METHODS

(71) Applicant: Donaldson Company, Inc., Bloomington, MN (US)

(72) Inventors: Philip Edward Johnson, Apple Valley, MN (US); Jonathan G. Parsons, Lino Lakes, MN (US); John K. Falk, III, Westwood, KS (US)

(73) Assignee: Donaldson Company, Inc., Bloomington, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/217,302

(22) Filed: Jun. 30, 2023

(65) Prior Publication Data

US 2024/0139666 A1    May 2, 2024

Related U.S. Application Data

(63) Continuation of application No. 17/521,480, filed on Nov. 8, 2021, now Pat. No. 11,712,650, which is a
(Continued)

(51) Int. Cl.
*B01D 46/00* (2022.01)
*B01D 29/15* (2006.01)
(Continued)

(52) U.S. Cl.
CPC ........... *B01D 46/523* (2013.01); *B01D 29/15* (2013.01); *B01D 29/19* (2013.01);
(Continued)

(58) Field of Classification Search
CPC .............. B01D 46/06; B01D 2265/028; B01D 2265/06; B01D 29/13; B01D 29/15;
(Continued)

(56) References Cited

U.S. PATENT DOCUMENTS 2,587,693 A    3/1952 Burks et al.
3,246,766 A    4/1966 Pall
(Continued)

FOREIGN PATENT DOCUMENTS

DE    2625416 A1    12/1977
EP    352188 A1    1/1990
(Continued)

OTHER PUBLICATIONS

Extended European Search Report for Application No. 19217555.2 mailed Apr. 21, 2020, 8 pages.
(Continued)

*Primary Examiner* — Minh Chau T Pham
(74) *Attorney, Agent, or Firm* — Merchant & Gould P.C.

(57) ABSTRACT

A filter element includes a construction of pleated filter media defining an interior volume. First and second opposite end caps are secured to opposite ends of the filter media. A support structure supports the filter media and is operably oriented in the interior volume. The support structure extends from the first opposing interior face to the second opposing interior face. The support structure is provided to extend less than a full extension between the first end cap and second end cap.

21 Claims, 21 Drawing Sheets

Related U.S. Application Data continuation of application No. 16/989,360, filed on Aug. 10, 2020, now Pat. No. 11,167,235, which is a continuation of application No. 15/437,195, filed on Feb. 20, 2017, now Pat. No. 10,773,202.

(60) Provisional application No. 62/302,378, filed on Mar. 2, 2016.

(51) Int. Cl.

| | | |
|---|---|---|
| *B01D 29/19* | (2006.01) | |
| *B01D 46/24* | (2006.01) | |
| *B01D 46/52* | (2006.01) | |
| *B01D 46/58* | (2022.01) | |
| *B01D 46/71* | (2022.01) | |

(52) U.S. Cl.
CPC .......... *B01D 46/2411* (2013.01); *B01D 46/58* (2022.01); *B01D 46/71* (2022.01); *B01D 2265/06* (2013.01); *B01D 2267/30* (2013.01); *B01D 2277/10* (2013.01)

(58) Field of Classification Search
CPC .. B01D 29/19; B01D 29/0029; B01D 46/002; B01D 46/04; B01D 46/08; B01D 46/0041; B01D 46/0068; B01D 46/523; B01D 46/2411; B01D 2267/30; B01D 2277/10
USPC .... 55/302, 361, 365, 378, 379, 490; 95/273, 95/280; 210/172.4
See application file for complete search history.

(56) References Cited

U.S. PATENT DOCUMENTS

| | | | |
|---|---|---|---|
| 3,252,270 A | 5/1966 | Pall et al. | |
| 3,594,992 A | 7/1971 | Carr et al. | |
| 3,710,552 A | 1/1973 | Genton | |
| 3,853,529 A * | 12/1974 | Boothe .............. | B01D 46/0001 55/514 |
| 3,941,571 A | 3/1976 | Getzin | |
| 4,141,128 A | 2/1979 | Wonderling | |
| 4,149,863 A * | 4/1979 | Ballard ................ | B01D 46/06 55/379 |
| 4,231,770 A | 11/1980 | Johnson, Jr. | |
| 4,259,095 A * | 3/1981 | Johnson, Jr. .......... | B01D 46/48 55/379 |
| 4,297,115 A | 10/1981 | Johnson, Jr. | |
| 4,324,571 A | 4/1982 | Johnson, Jr. | |
| 4,553,986 A | 11/1985 | Ciliberti et al. | |
| 4,738,696 A | 4/1988 | Staffeld | |
| 4,759,781 A | 7/1988 | Olson | |
| 4,878,930 A * | 11/1989 | Manniso ................ | D04H 1/492 210/321.82 |
| 5,230,455 A | 7/1993 | Price | |
| 5,395,409 A | 3/1995 | Klimczak et al. | |
| 5,505,852 A * | 4/1996 | van Rossen ........... | B01D 46/10 55/514 |
| 5,632,791 A | 5/1997 | Oussoren et al. | |
| 5,746,792 A | 5/1998 | Clements et al. | |
| 5,800,580 A | 9/1998 | Feldt | |
| 6,099,729 A | 8/2000 | Cella et al. | |
| 6,511,599 B2 | 1/2003 | Jaroszczyk et al. | |
| 6,875,342 B2 | 4/2005 | Shane | |
| 7,182,799 B2 | 2/2007 | Dries | |
| 7,354,469 B2 | 4/2008 | Volkmann | |
| 7,520,392 B2 | 4/2009 | Schewitz | |
| 7,597,734 B2 | 10/2009 | Johnson et al. | |
| 7,883,291 B2 | 2/2011 | Theisen et al. | |
| 8,021,467 B2 | 9/2011 | Zimmer | |
| 8,029,607 B2 | 10/2011 | Ray | |
| 8,282,713 B2 | 10/2012 | Smithies et al. | |
| 8,449,638 B2 | 5/2013 | Gieseke et al. | |
| 8,496,120 B2 | 7/2013 | Willuweit | |
| 8,580,004 B1 * | 11/2013 | Clements ............. | B01D 46/521 55/378 |
| 8,956,435 B2 * | 2/2015 | Appelo .................. | B01D 29/15 55/378 |
| 10,773,202 B2 * | 9/2020 | Johnson ............... | B01D 46/523 |
| 11,167,235 B2 * | 11/2021 | Johnson ............... | B01D 46/521 |
| 11,712,650 B2 * | 8/2023 | Johnson ................ | B01D 46/58 55/379 |
| 2002/0007734 A1 | 1/2002 | Felix | |
| 2002/0108359 A1 * | 8/2002 | Powell .................. | B01D 46/10 55/497 |
| 2003/0192294 A1 | 10/2003 | Smithies | |
| 2004/0250518 A1 | 12/2004 | Kao | |
| 2005/0082217 A1 | 4/2005 | Hagg et al. | |
| 2006/0174768 A1 | 8/2006 | Taylor et al. | |
| 2008/0092501 A1 | 4/2008 | Sporre et al. | |
| 2009/0217630 A1 | 9/2009 | Bitner | |
| 2010/0024639 A1 | 2/2010 | Taylor | |
| 2011/0209612 A1 | 9/2011 | Bansal et al. | |
| 2014/0109602 A1 * | 4/2014 | Cerdan ................. | F25D 17/042 62/85 |
| 2015/0151233 A1 | 6/2015 | Johnson et al. | |
| 2015/0314225 A1 | 11/2015 | Parsons et al. | |
| 2016/0177891 A1 | 6/2016 | Yadav et al. | |

FOREIGN PATENT DOCUMENTS

| | | |
|---|---|---|
| GB | 2295331 A | 5/1996 |
| JP | 2010240524 A | 10/2010 |
| WO | 9628235 A1 | 9/1996 |
| WO | 2015061599 A1 | 4/2015 |
| WO | 2016172101 A1 | 10/2016 |

OTHER PUBLICATIONS

International Search Report and Written Opinion for Application No. PCT/US2014/062019 mailed Feb. 12, 2015.

International Search Report and Written Opinion for Application No. PCT/US2017/018597 mailed Jun. 12, 2017.

\* cited by examiner

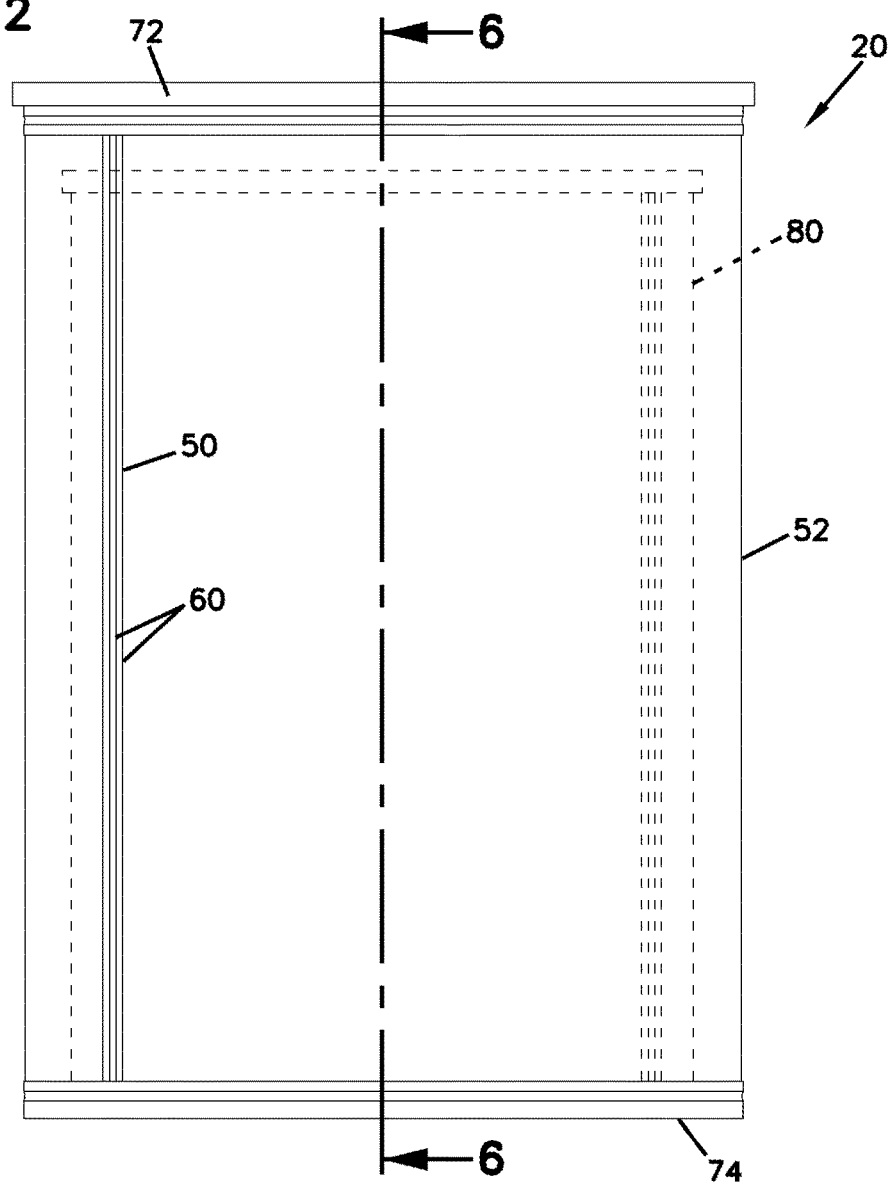
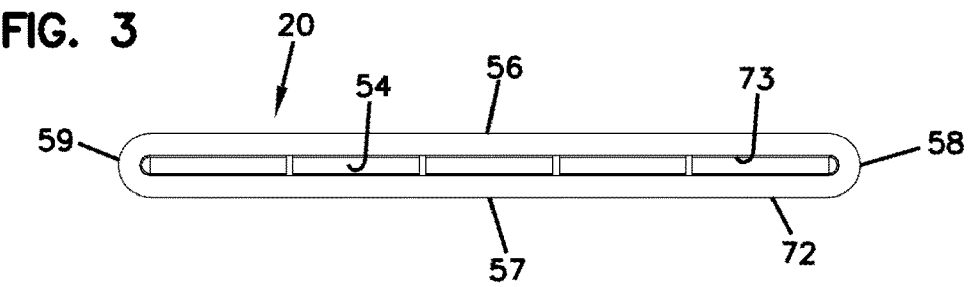
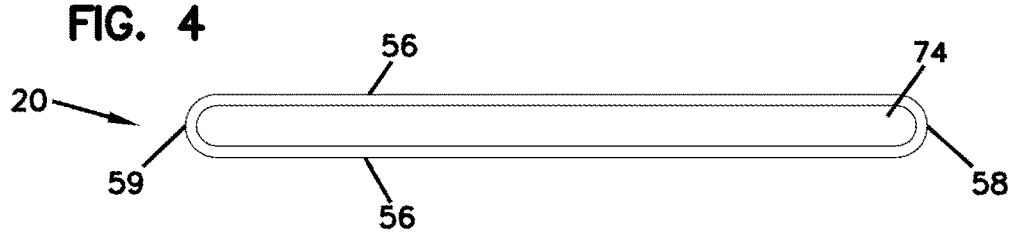

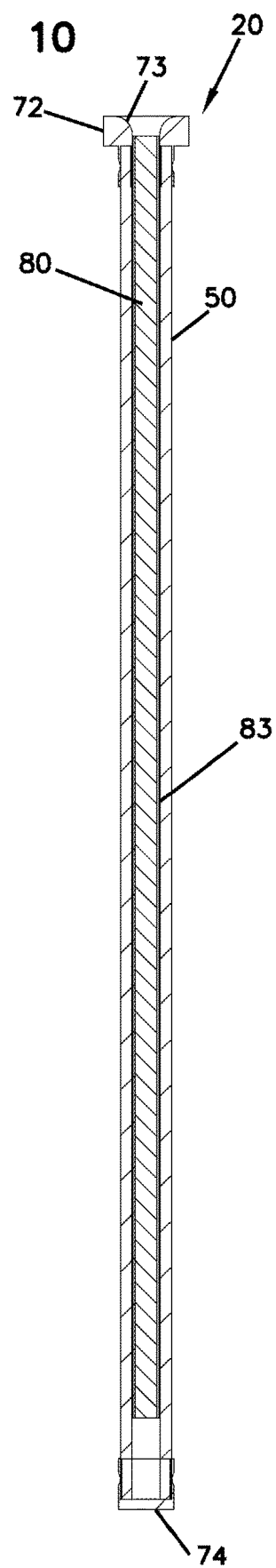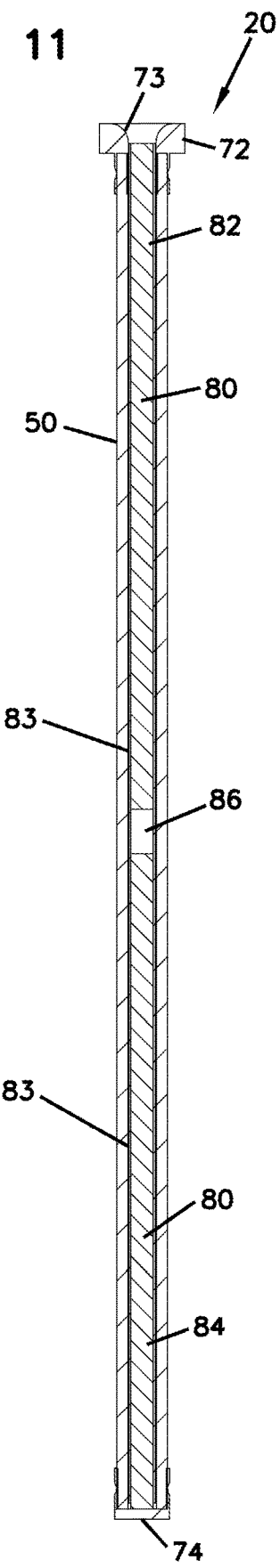

FIG. 26
FIG. 27
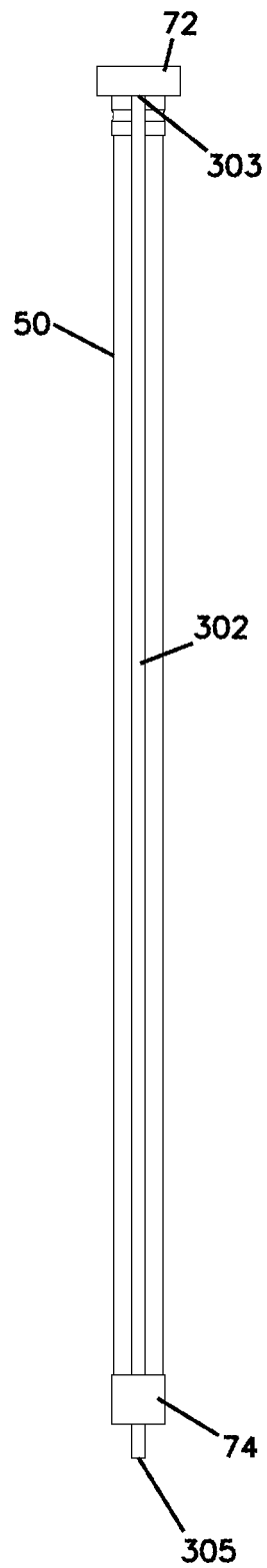
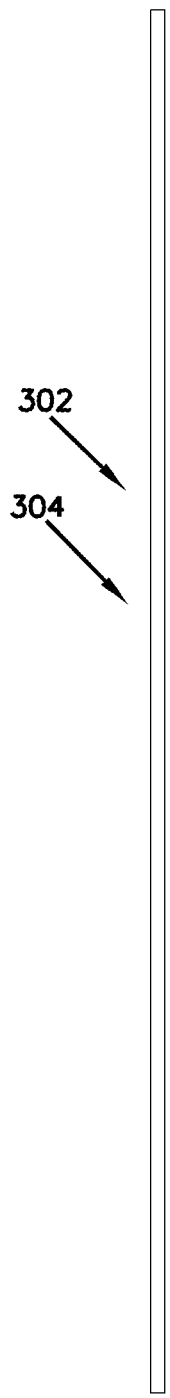
FIG. 28
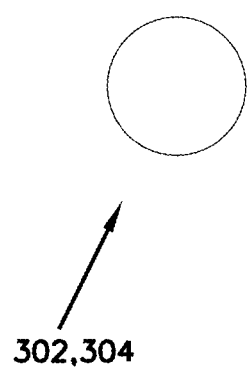

FIG. 32
FIG. 33
FIG. 34
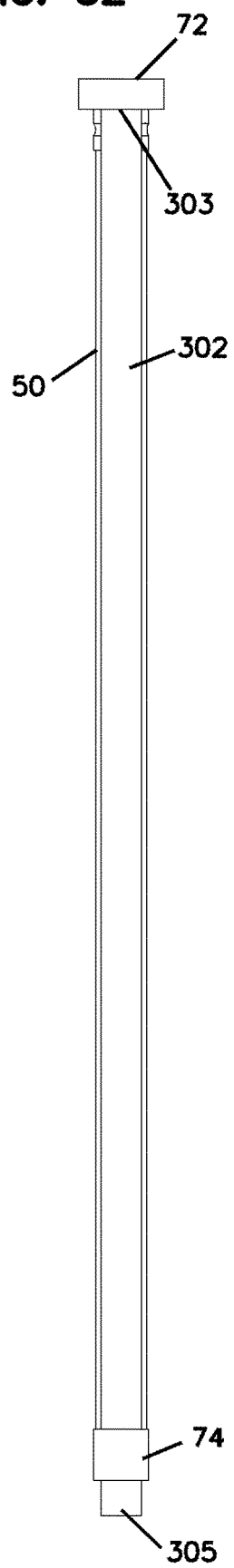
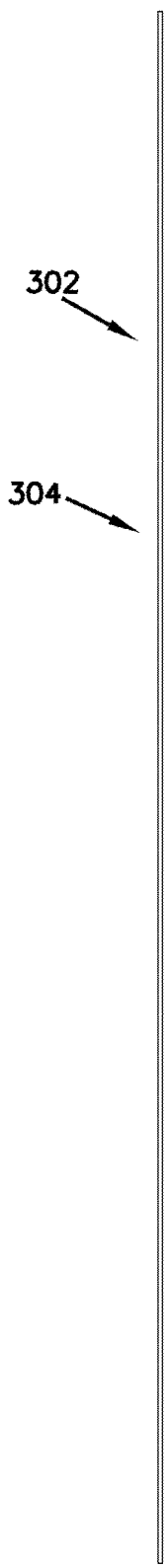
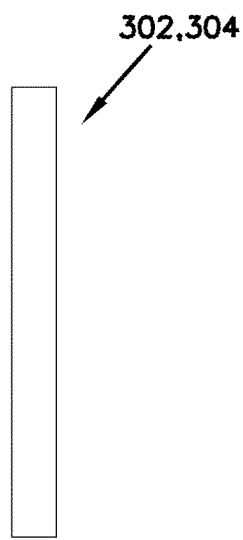

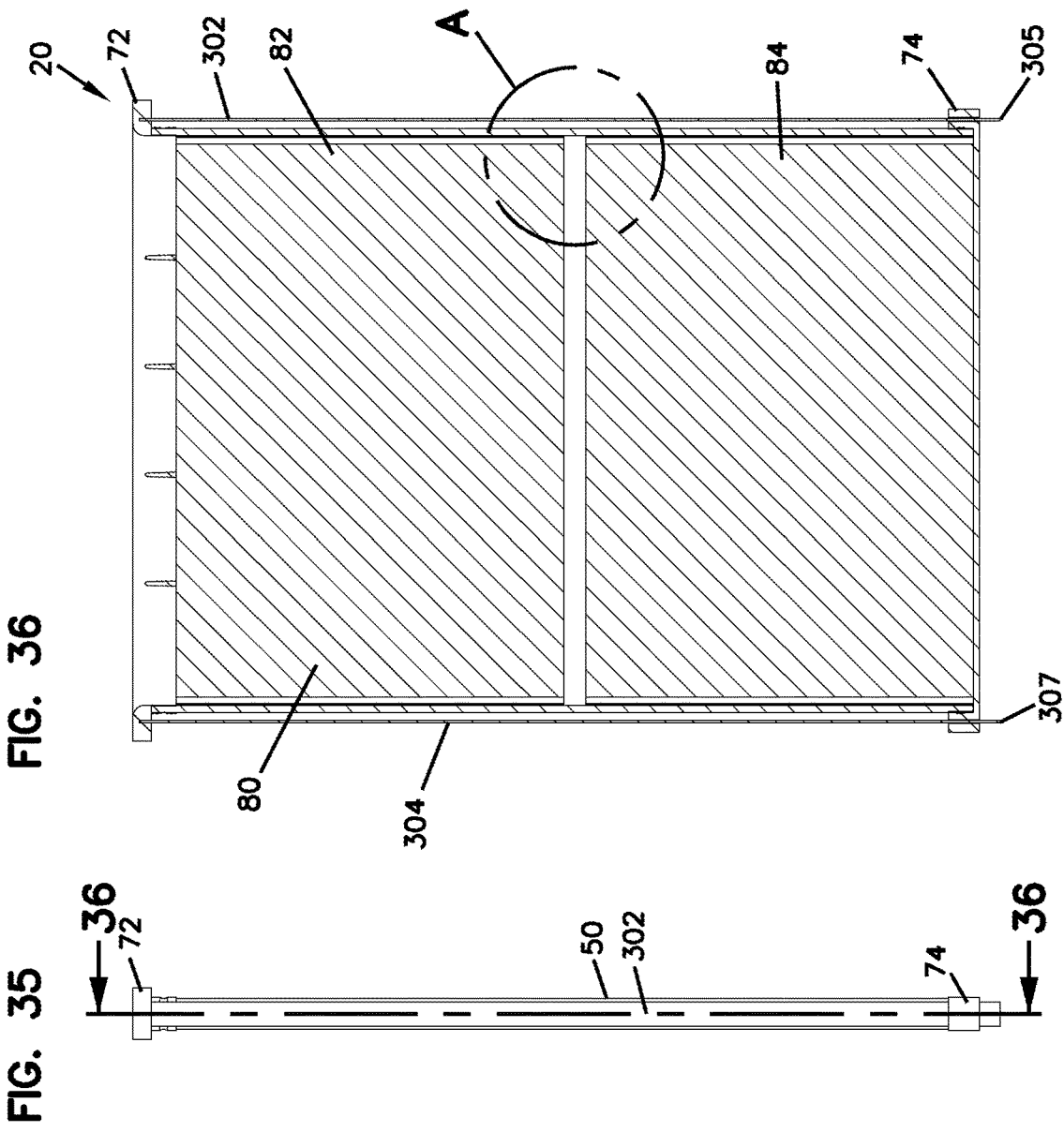
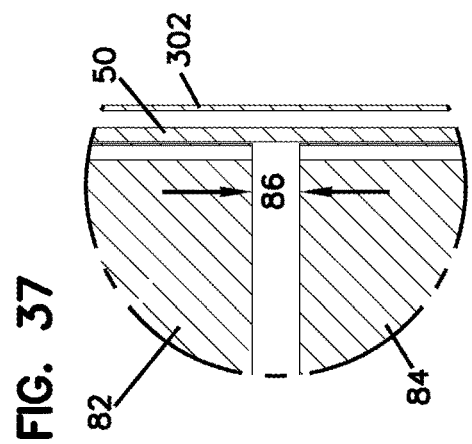

FILTER ELEMENT HAVING INNER SUPPORT AND METHODS

This application is a continuation application of U.S. patent application Ser. No. 17/521,480, filed Nov. 8, 2021 which is a continuation of U.S. patent application Ser. No. 16/989,360, filed Aug. 10, 2020, issued as U.S. Pat. No. 11,167,235, now U.S. Pat. No. 11,712,650, which is a continuation of U.S. patent application Ser. No. 15/437,195, filed Feb. 20, 2017, issued as U.S. Pat. No. 10,773,202, which claims priority under 35 USC § 119(e) to U.S. provisional patent application No. 62/302,378 filed Mar. 2, 2016, which application is incorporated herein by reference.

TECHNICAL FIELD

This disclosure concerns a filter element of pleated media having a porous support structure. This disclosure also concerns a dust collector utilizing these filter elements and method of pulse cleaning the filter elements.

BACKGROUND

Filter elements of pleated media are often arranged in a tubular construction. By the word "tubular", it is meant a closed loop, which can be round, non-round, oval, elliptical, racetrack shaped, etc. The filter elements can be used in a variety of applications such as cleaning the air intake for compressors or filtering the air in dust collectors. In many cases, the fluid to be filtered flows from the exterior, through the pleats, and into the open interior volume of the tubular construction. In many situations, it is desirable to support the pleated media from within the interior volume of the filter element in order to prevent the pleats from collapsing against themselves in the interior volume. When the tubular construction is oval, elliptical, or racetrack shaped, the problem with having the pleats collapse against themselves is even more of an issue because of the geometry of the cross-sectional shape of the media construction.

One typical approach to supporting the filter media within the interior of the filter includes using an inner filter liner. The inner filter liner is often made from metal and is porous to allow fluid flow there through. There have been uses in the prior art of non-metal inner liners, as well.

When used in dust collectors, filter elements can be periodically cleaned by back flushing the elements through the use of a pulse of compressed gas or air. The durability of the filter elements is important for long filter life. In prior art elements that have an inner liner that extends an entire length between the end caps, the pulse cleaning process can cause stress as the filter media tries to bow outwardly. This may cause a failure point by tearing the media where it is connected to the end caps, or by causing damage by the inner liner to the end caps, leading to premature failure, leak paths, or other problems.

Improvements in filter elements and media support are desirable.

SUMMARY

In accordance with principles of this disclosure, a filter element is provided. The filter element includes a construction of pleated filter media defining an interior volume. First and second opposite end caps are secured to opposite ends of the filter media. A support structure bridges the filter media and is operably oriented in the interior volume. The support structure extends from the first opposing interior face to the second opposing interior face. The support structure is provided to extend less than a full extension between the first end cap and second end cap.

One of the advantages of having the support structure with at least one end freely floating and unattached or disconnected to any other portion of the filter element is that it allows the filter element to expand and contract axially. During pulse cleaning of the filter element, the elements are allowed to have the media bow outwardly (expand) and then return to the original shape, which can be in a dynamic, fast, slapping motion. This helps to clean the filter elements by shaking the dust off of the media.

The support structure may include one of a pleated or extruded construction.

The pleats of each of the support structure of the pleated construction may extend about parallel to the direction of pleats of the pleated filter media.

The pleated construction may comprise a semi-rigid pleated screen.

The support structure may be non-metal.

The first end cap can be an open end cap in communication with the interior volume.

The second end cap may be a closed end cap.

In one or more embodiments, the support structure is secured to the second end cap.

In some arrangements, the support structure is unsecured and free of the first end cap.

In some arrangements, the support structure may include a first section secured to the first end cap, a second section secured to the second end cap, and the element being free of support structure in a region between the first section and the second section.

The support structure may be secured to the first end cap, while the support structure is unsecured and free of the second end cap.

The pleated media may be non-round.

The pleated filter media may be racetrack shaped, having a pair of parallel sides joined by a pair or rounded ends In one or more embodiments, the filter element is metal-free.

In some arrangements, the filter element is free of inner and outer liners.

In some arrangements, the support structure comprises a metal construction.

In some embodiments, the support structure comprises an extruded construction.

In one or more arrangements, the support structure is an extruded plastic inner liner.

The support structure may include an expanded metal construction.

The support structure may be embodied as an inner liner.

A length of the filter element between the first and second end caps can be at least 2 inches.

A length of the filter element between the first and second end caps can be at least 20 inches and no greater than 100 inches.

In another aspect, a dust collector is provided. The dust collector includes a housing having a dirty air inlet, a dirty air plenum, a clean air outlet, a clean air plenum, and a tubesheet separating the dirty air plenum from the clean air plenum. A plurality of filter elements, as characterized variously above, are removably mounted in the tubesheet.

The dust collector may further include a cleaning system mounted to emit pulses of gas into the filter elements from a downstream side of the filter element to an upstream side to clean the filter elements.

In another aspect, a method of filtering includes providing a dust collector as characterized above. There is a step of directing fluid to flow through the pleated filter media and into the interior volume. While the fluid is flowing through the pleated filter media, there is a step of supporting the filter media to prevent the filter media from collapsing together by using the support structure. The method includes periodically emitting a pulse of gas into the interior volumes of the filter elements and allowing the filter media to expand and axially contract.

It is noted that not all of the specific features described herein need to be incorporated in an arrangement for the arrangement to have some selected advantage according to the present disclosure.

BRIEF DESCRIPTION OF THE DRAWINGS

FIG. 2 is a front view of the filter element according to aspects of this disclosure;

FIG. 3 is a top view of the filter element of FIG. 2;

FIG. 4 is a bottom view of the filter element of FIG. 2;

FIG. 10 is a cross-sectional view of an alternate embodiment of the filter element of FIG. 2, the cross-section being taken along the line 6-6 of FIG. 2;

FIG. 11 is a cross-sectional view of another alternate embodiment of the filter element of FIG. 2, the cross-section being taken along the line 6-6 of FIG. 2;

FIG. 26 is a side view of the filter element of FIG. 23;

FIG. 27 is a front view of one of the rails used in the filter element of FIGS. 23-26;

FIG. 28 is a top view of the rail of FIG. 27;

FIG. 32 is a side view of the filter element of FIG. 29;

FIG. 33 is a front view of one of the rails used in the filter element of FIGS. 29-32;

FIG. 34 is a top view of the rail of FIG. 33;

FIG. 35 is a side view of another filter element according to aspects of this disclosure;

FIG. 36 is a front, cross-sectional view of the filter element of FIG. 35, the cross-section being taken along the line 36-36 of FIG. 35;

FIG. 37 is an enlarged view of portion A of the filter element shown in FIG. 36;

DETAILED DESCRIPTION

A. Example Dust Collector

Figure 1:
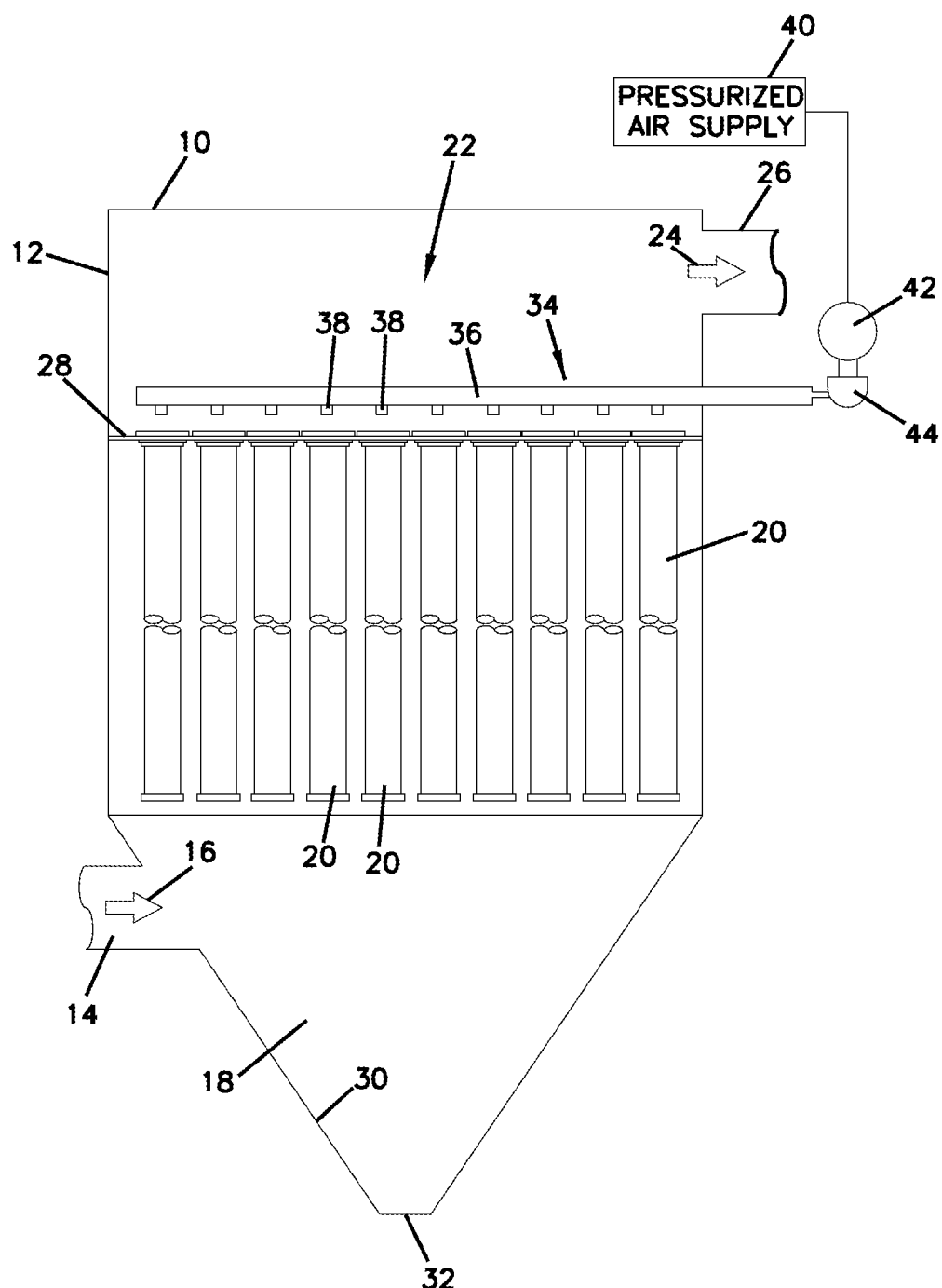
FIG. 1 is a schematic view of the example dust collector that utilizes filter elements in accordance with aspects of this disclosure.
Figure 5:
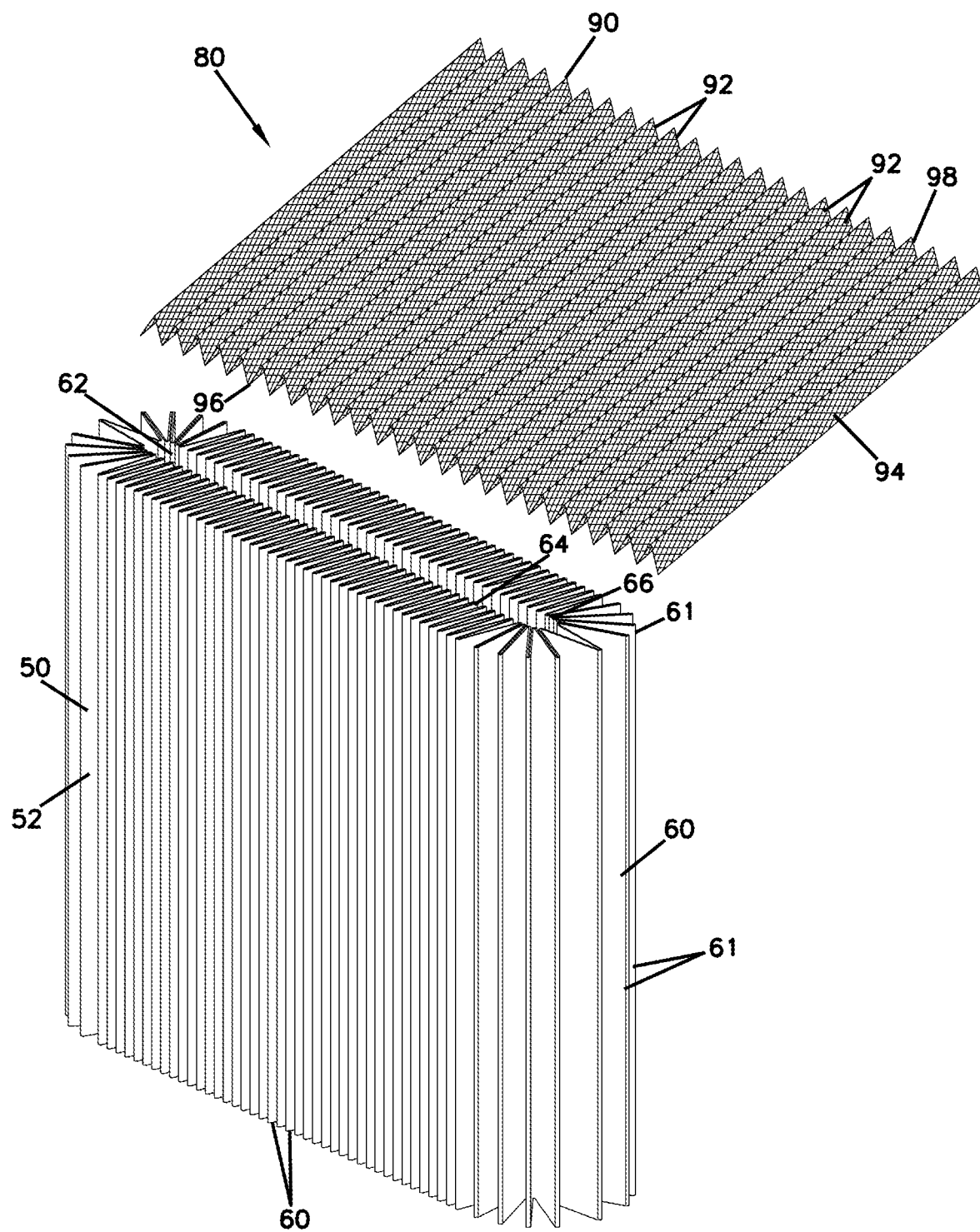
FIG. 5 is a perspective view of the filter media and a support structure that can be incorporated in the filter element of FIGS. 2-4.

FIG. 1 illustrates one example application in which the filter element constructed according to principles of this disclosure can be utilized. A dust collector 10 includes a housing 12. The housing 12 has an inlet 14 for in taking unfiltered or dirty air, as shown at arrow 16. The housing 12 defines within an interior a dirty air plenum 18. The dirty air plenum 18 is also where a plurality of filter elements 20, constructed in accordance with principles of this disclosure, are mounted. The filter elements 20 will remove particulate (e.g., dust) from the air in the dirty air plenum 18.

After passing through the filter elements 20, the clean or filtered air flows into a clean air plenum 22. The clean air plenum 22 is also within an interior of the housing 12. The clean air flows at arrow 24 through a clean air outlet 26.

A tubesheet 28 divides the interior of the housing between the dirty air plenum 18 and clean air plenum 22. The tubesheet 28 is typically made from sheet metal and has a plurality of holes or apertures for holding elements 20, such that the filter elements 20 are removably mounted within the tubesheet 28. The filter elements 20 are removably sealed to the tubesheet 28 to prevent dirty air from bypassing the filter elements and flowing into the clean air plenum 22 without being filtered by the filter elements 20.

The housing 12 can have sloped walls 30 in the dirty air plenum 18 so that particulate and dust removed from the air will fall by gravity and fall along the sloped walls 30. There can be a drum or other type of collector at the base 32 to remove dirt from the dirty air plenum 18.

The filter elements 20 are periodically cleaned by emitting a pulse of gas, such as compressed air, from the downstream side of the elements 20 to the upstream side. This is a way of back flushing the filter elements 20 and removing any dust or dirt that has built up on the upstream side of the filter elements 20. In this embodiment, a cleaning system is shown at 34. The cleaning system 34 includes a blowpipe 36 having a plurality of nozzles 38. In this embodiment, there is illustrated one nozzle 38 for each filter element 20. However, in other embodiments, there does not necessarily need to be one nozzle per element. The blowpipe 36 is in communication with a pressurized air supply 40, which is in communication with a header pipe 42 and pulse valve 44. Other embodiments are possible, and this is just one example.

In operation, dirty air will flow through the dirty air inlet 14, into the dirty air plenum 18, and then flow through at least one of the filter elements 20. The filter elements 20 will filter or remove dirt and particulate from the air. The clean filtered air will flow through a downstream side of the elements 20 and into the clean air plenum 22, before exiting the dust collector 10 through the clean air outlet 26. The filter elements 20 will be periodically cleaned by emitting a pulse of compressed gas or air from the nozzles 38 and into the filter elements 20 by flowing from the downstream side of the elements 20 into the upstream side of the elements 20. When this is done, there will be a pressure differential on each element 20 from the downstream side to the upstream side. In prior art systems, this pressure differential could cause the filter elements to fail by tearing at either or both end caps. The filter elements 20 are improvements over the prior art in that the filter elements 20 are constructed to allow the filter media to expand or bow outwardly and axially contract along its length, without failure along one of the end caps. Advantageous constructions to the filter elements 20 are explained further below.

B. Improved Filter Element 20

FIGS. 2-11 are illustrations of an example embodiment of filter element 20 usable in the dust collector 10. The filter element 20 includes a construction of pleated media 50. The pleated media 50 can be a tubular shape 52 defining an interior volume 54. The tubular shape 52 can be any shape forming a closed loop, such as round, non-round, oval, ovate, rectangular, elliptical, or racetrack shaped. In the embodiment shown in FIGS. 2-4, the filter element 20 is racetrack shaped, in that it has a pair of opposite parallel sides 56, 57 joined by curved ends 58, 59. In the embodiment of FIGS. 13-16, the filter element 20 is cylindrical in which the pleated media 50 is cylindrical having a generally round cross-section.

The pleated media 50 has a plurality of pleats 60. In FIG. 2, only some of the pleats 50 are illustrated for purposes of clarity. The pleats 60, in the embodiment shown, have outer pleat tips 61 and inner pleat tips 62. The outer pleat tips 61 are along the exterior of the pleated media 50. The inner pleat tips 62 are along the interior volume 54. The pleated media 50, when in the tubular shape, has first and second opposing faces 64, 66, which generally correspond to the inner pleat tips 62.

The filter element 20 includes a first end cap 72. At an opposite end of the element 20, there is a second end cap 74. The first end cap 72 and second end cap 74 are secured to opposite ends of the filter media 50.

In the example shown, the first end cap 72 is an open end cap having an opening 73 in communication with the interior volume 54. The second end cap 74 can be opened or closed, and in the embodiment shown, it is a closed end cap.

The pleated media 50 can be secured to the first and second end caps 72, 74 by, for example, molding the ends of the pleated media 50 within the end caps 72, 74. In some examples, the first end cap 72 and the second end cap 74 are made from a non-metal, molded material. In some examples, the first and second end caps 72, 74 can be made of other types of material and have the media 50 secured through the use of a potting material, for example. The end caps 72, 74 are typically made from a urethane material.

The filter element 20 will typically have a seal structure or gasket to provide an airtight seal between the element 20 and whatever structure the element 20 is installed. For example, when used in dust collector 10, there will usually be a seal or gasket between the open end cap 72 and the tubesheet 28 to form a seal therebetween.

The filter element 20 further includes a support structure 80. The support structure 80 supports the pleated filter media 50. By the term "supports", it is generally meant a structural mechanism to resist opposing forces. The support structure 80 prevents pleat collapse and crushing of the filter element 20 through the interior. By "pleat collapse", it is meant that the support structure 80 prevents individual pleats from collapsing inwardly toward the interior volume 54 of the element 20 and the element 20 crushing together through the interior.

The support structure 80 is operably oriented in the interior volume 54 of the pleated media 50. In many examples, the support structure 80 supports the pleated media 50. It may extend, or bridge between the first opposing interior face 64 to the second opposing interior face 66. For example, the support structure 80 extends from the first opposing interior face 64 to the second opposing interior face 66 to structurally support the pleated media 50.

The support structure 80 functions to structurally support or brace the pleated media 50 while being operably oriented in the interior volume 54. In the embodiments of FIGS. 2-12, the support structure 80 is not an inner liner for the pleated media 50. In the examples of FIGS. 2-12, the support structure 80 can structurally support the pleated media 50 in the absence of an inner liner, or they may include a supportive rigid inner liner. In some embodiments, the entire filter element 20 may be inner liner-free. In further example embodiments, the filter element 20 is both outer liner and inner liner free. In other embodiments, however, as can be seen in connection with the embodiments of FIGS. 13-16, the support structure 80 in those embodiments is an inner liner 200.

In one or more embodiments, the filter element 20 includes an inner screen 83 lining the interior volume 54. The inner screen 83 may be embodied in many forms including either a supportive and rigid inner liner to provide structural bracing of the element 20, or in the form of a non-supportive liner that does not structurally brace the element 20. In some embodiments, the inner screen 83 can be non-metal, such as plastic, and porous forming an open grid to allow air flow therethrough. The screen 83 can extend between and be secured to each of the first end cap 72 and second end cap 74. Alternatively, the inner screen 83 can extend only partially between the first end cap 72 and second end cap 74. In some embodiments, the inner screen 83 is secured to the second end cap 74 and extends along the inner pleat tips 62 partially of the length to the first end cap 72. In other embodiments, the inner screen 83 can be secured to the first end cap 72 and extend partially of the length to the second end cap 74. The inner screen 83 may comprise a perforated facing.

In accordance with principles of this disclosure, the support structure 80 extends less than a full extension between the first end cap 72 and the second end cap 74. Preferably, the support structure 80 has at least one free-floating end that is unsecured or unattached from a remaining portion of the filter element 20.

In preferred arrangements, the support structure 80 is not bonded to the inner pleat tips 62. That is, the support structure 80 is attachment-free or bond-free relative to the inner pleat tips 62. The outer pleat tips 61 are free to bow outwardly during pulse cleaning.

Figure 6:
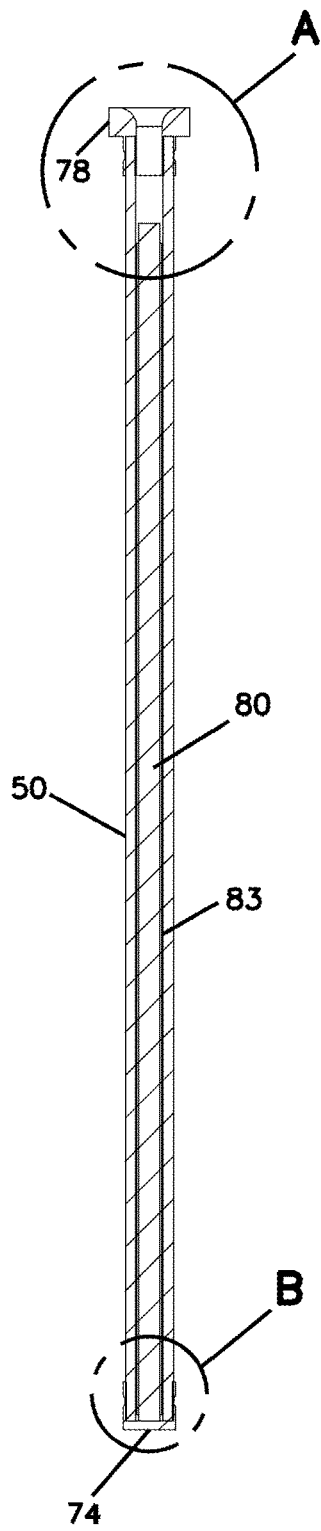
FIG. 6. is a cross-sectional view of the filter element of FIG. 2, the cross-section being taken along the line 6-6 of FIG. 2.
Figure 7:
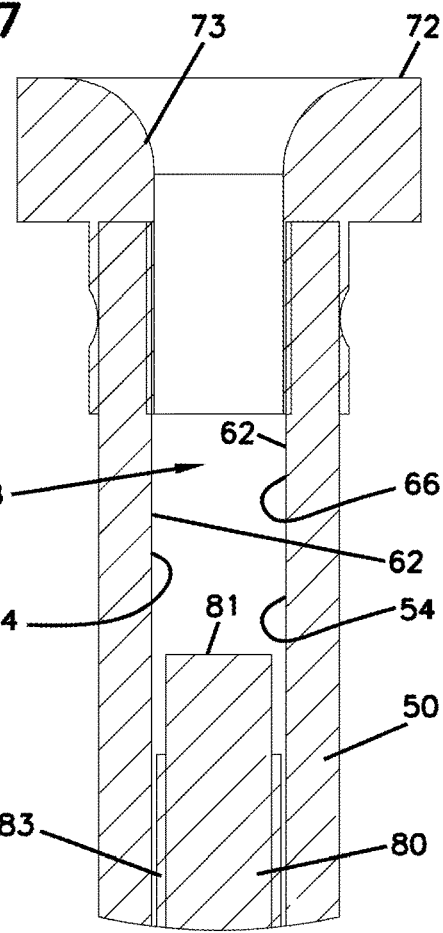
FIG. 7 is an enlarged view of the portion A shown in FIG. 6.
Figure 8:
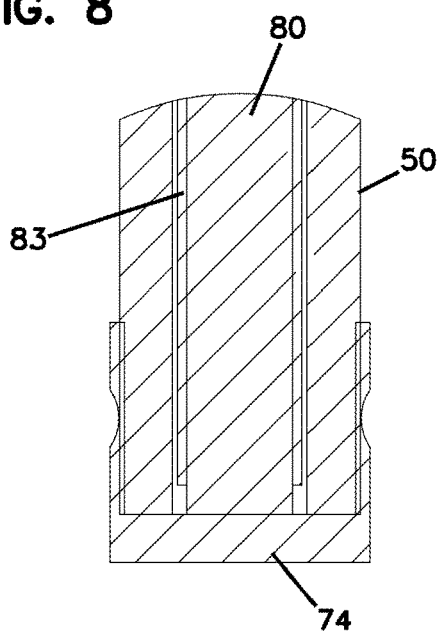
FIG. 8 is an enlarged view of the portion B shown in FIG. 6.

In the embodiment shown in FIGS. 6-8, the support structure 80 is secured to the second end cap 74. In this embodiment, the support structure 80 is unsecured and free of the first end cap 72. As can be seen in FIGS. 6-8, the support structure 80 is encapsulated and fixed within the second end cap 74 and extends less than a full extension of a length of the filter element 20 (between end caps 72, 74) to the first end cap 72. As can be seen in FIG. 7, in this embodiment, there is a space or gap 78 between a free end 81 of the support structure 80 and the first end cap 72. The space or gap 78 is an open volume that is support structure-free. The support structure 80 is spaced a distance less than 50%, typically less than 25%, and often less than 10% from the first end cap 72 of the full extension between the first end cap 72 and second end cap 74.

Many arrangements are possible. For example, in the arrangement of FIG. 10, the support structure 80 is secured to the first end cap 72 and is unsecured and free of the second end cap 74. In FIG. 10, the support structure 80 extends more than 50% and less than 99% of the full length between the first end cap 72 and second end cap 74. For example, the support structure 80 can extend between 80% and 98% of the full length between end cap 72 and end cap 74.

In the embodiment of FIG. 11, the support structure 80 includes a first section 82 secured to the first end cap 72 and a second section 84 secured to the second end cap 74. The filter element 20 is free of support structure in a support structure-free region 86 that is located axially between the first section 82 and second section 84. In the example shown in FIG. 11, the region 86 is about in a center between the first end cap 72 and second end cap 74. It should be understood that the support free region 86 can be located anywhere along the length between the first end cap 72 and second end cap 74. The region 86 has a length that is less than 30%, typically less than 20%, and often less than 10% of the overall length between end cap 72 and end cap 74.

The support structure 80 can be attached to one or more of the end caps 72, 74 through a variety of ways. For example, the support structure 80 can be molded with the end cap 72, 74 to bond it therewith. The support structure 80 may also be potted, with a potting material to the end cap 72, 74. Other ways can be used including using adhesive, bonding agents, or other bonding techniques.

There are many embodiments possible for the support structure 80. In the example shown in FIG. 5, the support structure 80 comprises a pleated construction 90. The pleated construction 90 has at least a partial section with a plurality of pleats 92. The plurality of pleats 92 in the pleated construction 90 can be extending in a direction that is parallel or non-parallel relative to a direction of pleats 60 in the pleated filter media 50. Preferably, the pleats 92 extend in a direction parallel relative to the direction of pleats 60 of the pleated filter media 50. In embodiments that include inner screen 83, the inner screen 83 prevent the pleated filter media 80 from interlocking with the pleats 92 of the support structure 80. In embodiments that include perforated facing or inner screen 83, the pleated construction 90 may include the perforated facing 83 on opposite sides thereof.

In other embodiments, the direction of pleats 92 may be angled at a non-zero angle relative to the direction of the pleats 60 of the pleated filter media 50. In one or more embodiments, the angle can be at least 45 degrees, often at least 70 degrees, for example, an angle 80-100 degrees.

The pleats 92 will typically extend from the first opposing interior face 64 to the second opposing interior face 66 of the interior volume 54 of the pleated filter media 50.

The pleated construction 90 can be made from many types of materials. In preferred constructions, the pleated construction 90 comprises a semi-rigid pleated screen 94. The pleated screen 94 can be made from plastic or a reinforced cellulose. The pleated screen 94 has an open screen or mesh to allow for fluid to flow therethrough. Preferably, the pleated construction 90 has a void volume of no more than 60%.

The overall length of the filter element 20 between the first and second end caps 72, 74 is often at least 2 inches. In some embodiments, the length can be greater than 50 inches. In many embodiments, the length of the filter element between the first and second end caps 72, 74 is at least 20 inches and no greater than 100 inches. The filter element 20 can be made from non-metal materials such that it is metal-free.

The pleated construction 90 will extend less than a full extension between the first end cap 72 and second end cap 74. As explained above, this can be implemented by anchoring one end 96 of the pleated construction 90 to one of the end caps 72, 74 while allowing an opposite end 98 of the pleated construction 90 to float and be free of connection to the opposite end cap or to any other portion of the filter element 20. FIG. 11 also shows the embodiment of anchoring the pleated construction 90 to both end caps 72, 74 but then having a discontinuous region 86 that is free of support structure 80.

One of the advantages of having the support structure 80 with at least one end freely floating and unattached or disconnected to any other portion of the filter element 20 is that it allows the filter element 20 to expand and contract axially. See FIG. 9. During pulse cleaning of the filter element 20 in dust collector 10, the elements 20 are allowed to have the media 50 bow outwardly (expand, see the broken lines 50 in FIG. 9) and then return to the original shape (see the solid lines 50 in FIG. 9), which can be in a dynamic, fast, slapping motion, represented by arrow 70. This helps to clean the filter elements 20 by shaking the dust off of the media 50. In prior art elements that have an inner liner that extends an entire length between the end caps, the pulse cleaning process will cause stress as the filter media tries to bow outwardly causing a failure point by tearing the media where it is connected to the end caps, leading to premature failure, leak paths, or other problems. The filter element 20 avoids this problem because the support structure 80 has at least one free end that is disconnected, unattached, and freely floating within the element 20, allowing the element 20 to axially contract as the end caps 72, 74 move closer together and the media 50 bows radially outwardly. The support structure 80 also prevents pleat collapse.

Figure 12:
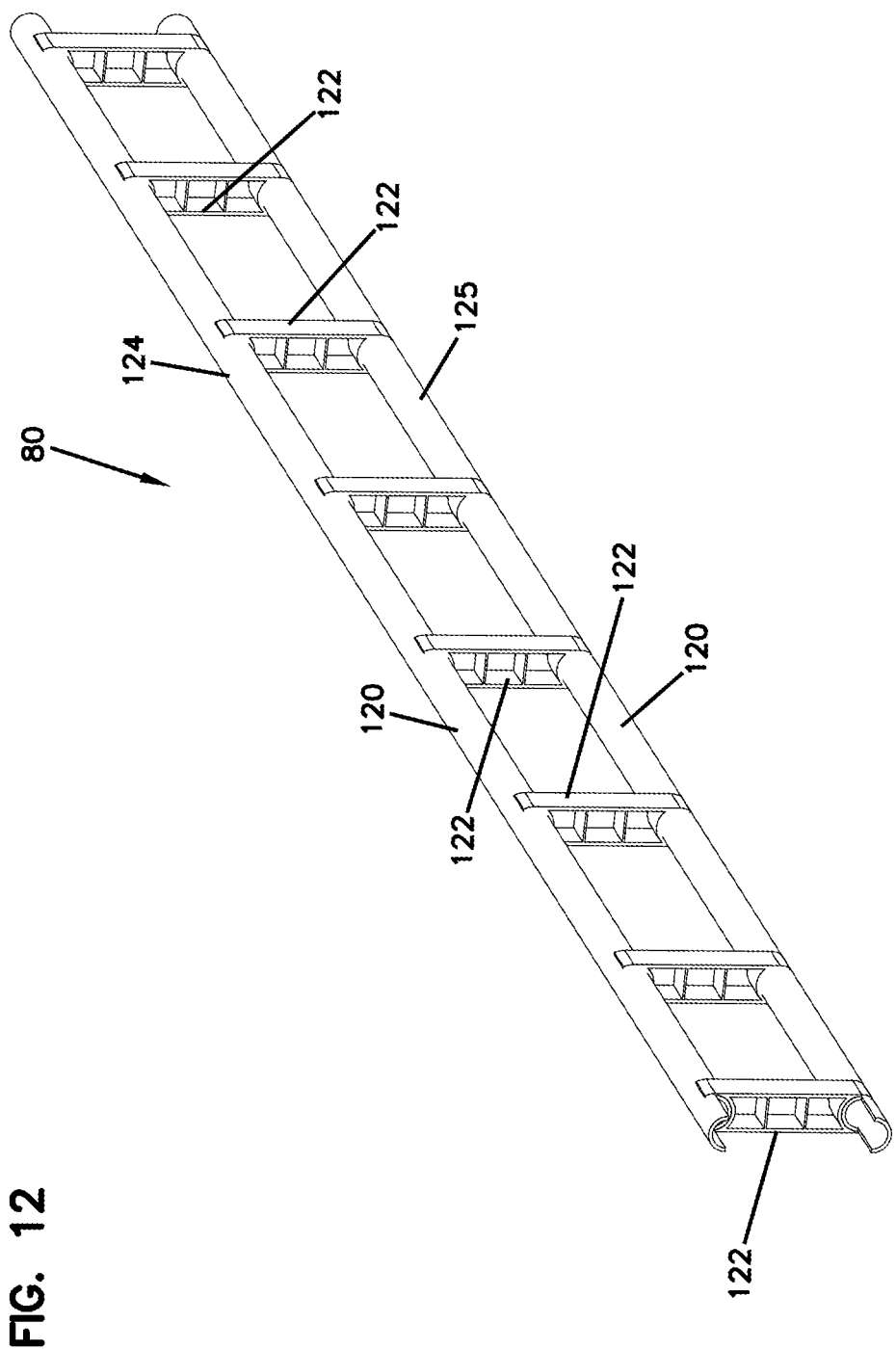
FIG. 12 is a perspective view of an alternate embodiment of a support structure useable with the filter media of FIG. 5 and the filter element of FIGS. 2-4.

Another embodiment of support structure 80 is illustrated in FIG. 12. In the FIG. 12 embodiment, the support structure 80 is an extrusion or injection molded structure. In the example illustrated in FIG. 12, the support structure 80 comprises a plurality of columns 120. The columns 120 are secured to each other with a plurality of cross braces 122. In the example shown, there are two columns 124, 125 spaced from each other. The columns 124, 125 are porous and depicted as hollow cylinders, but could be any shape. The cross braces 122 are shown perpendicular to the columns, but could be various angles relative to the columns 124, 125. The columns 124, 125 and the cross braces 122 can be made from a plastic extrusion or by injection molding. The cross braces 122, in the example illustrated, are eight spaced apart from each other, but can be more or fewer. Each cross brace 122 is shown as ladder shaped in cross-section, with opposite rails being secured to opposite sides of each column 124, 125.

In the embodiment of FIGS. 13-16, alternate embodiments of filter elements 20 are depicted. In these embodiments, the support structure 80 is an inner core or inner liner 200. FIGS. 13-16 depict cylindrical elements 20 having a round cross-section. Pleated media 50 forms the cylinder and defines an open filter interior 54. Lining the filter interior 54, adjacent to the inner pleat tips 62 is the inner core 200. The inner core 200 is typically free and unattached to the inner pleat tips 62.

Figure 13:
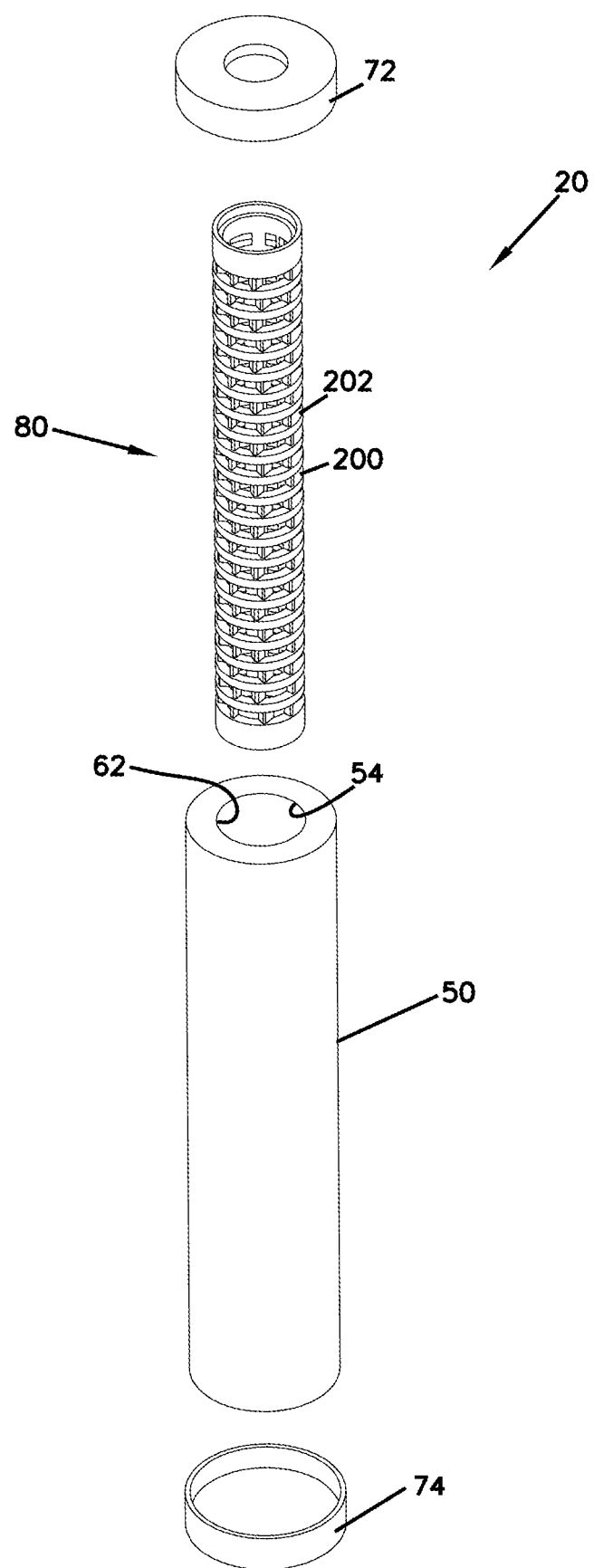
FIG. 13 is an exploded perspective view of another embodiment of a filter element usable in the dust collector of FIG. 1.
Figure 14:
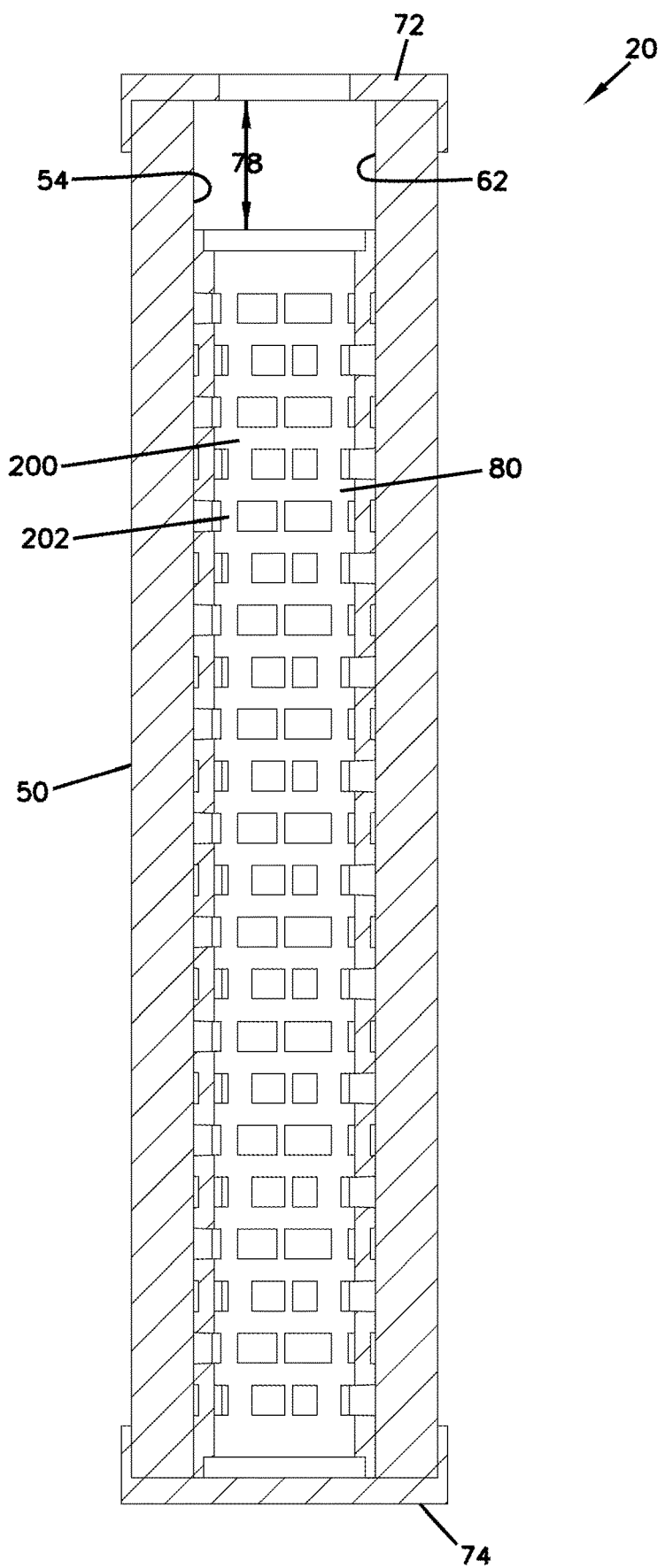
FIG. 14 is a cross-sectional view of the filter element of FIG. 13.

In FIGS. 13-14, the inner core 200 is non-metal. In some examples, it is plastic. In example embodiments of FIGS. 13-14, the inner core 200 is an extruded plastic inner liner 202.

Figure 15:
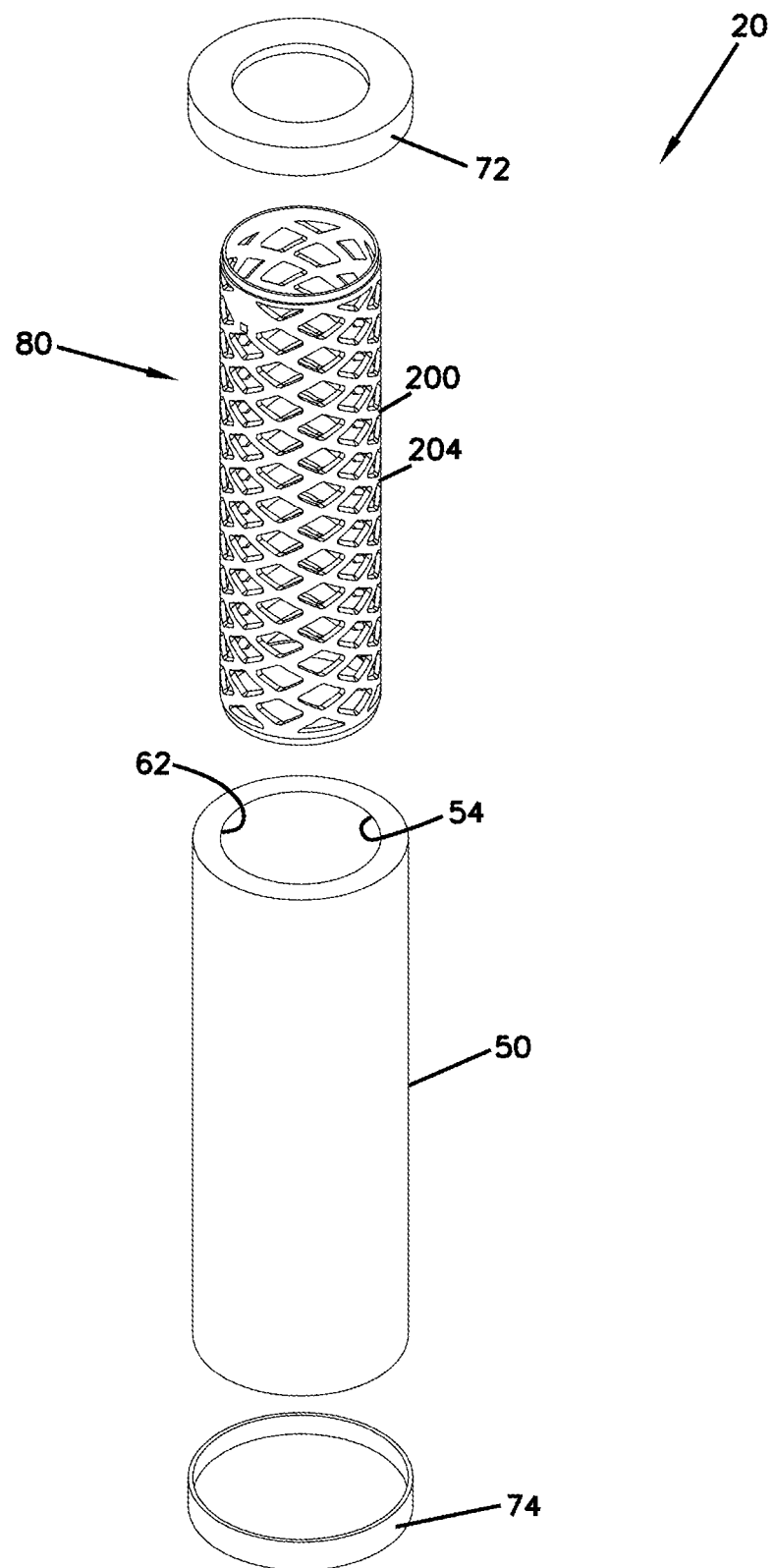
FIG. 15 is an exploded perspective view of another embodiment of a filter element usable in the dust collector of FIG. 1.
Figure 16:
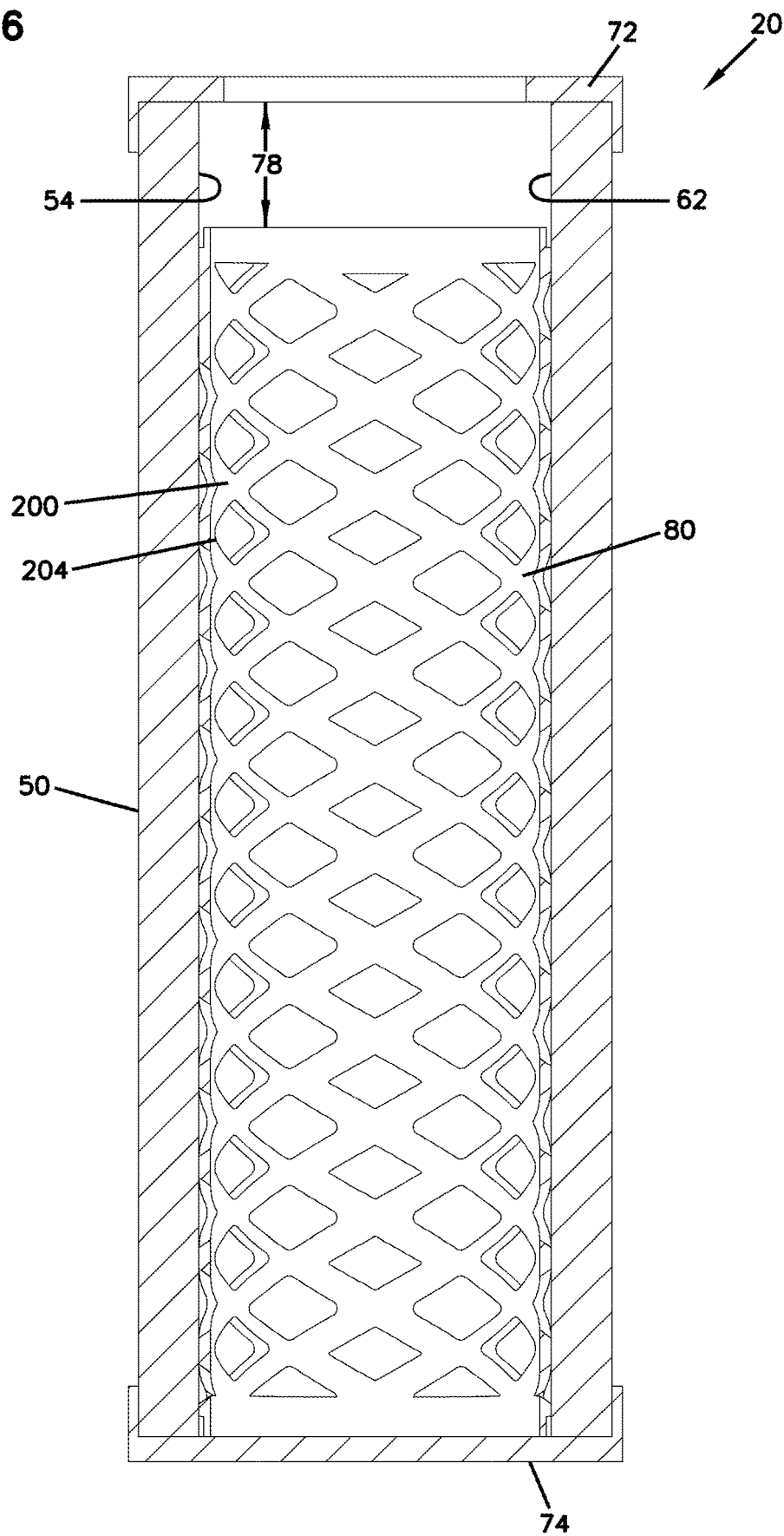
FIG. 16 is a cross-sectional view of the filter element of FIG. 15.
Figure 17:
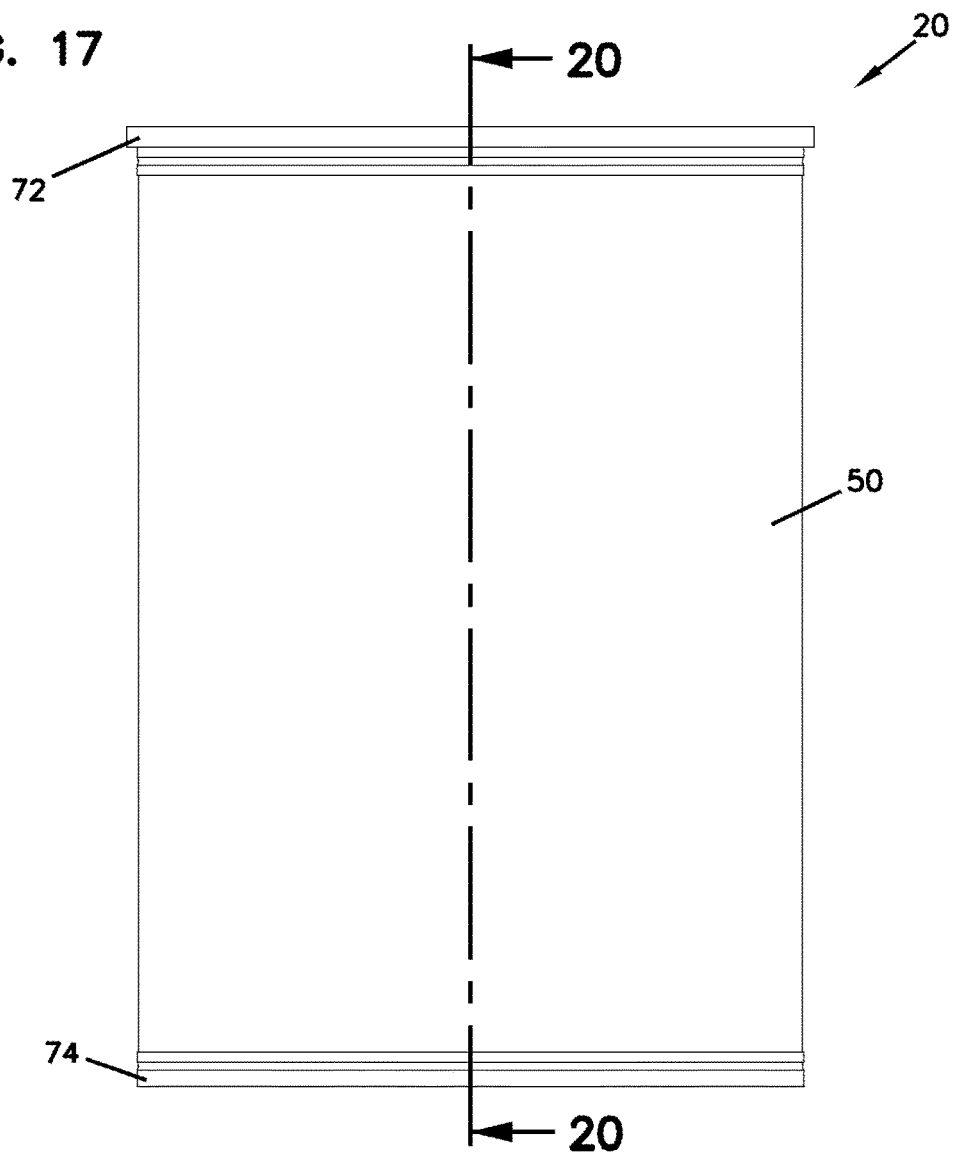
FIG. 17 is a front view of another embodiment of a filter element, according to aspects of this disclosure.
Figure 18:
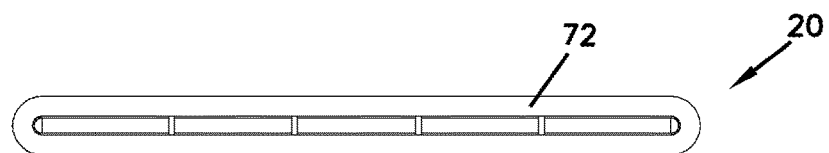
FIG. 18 is a top view of the filter element of FIG. 17.
Figure 19:
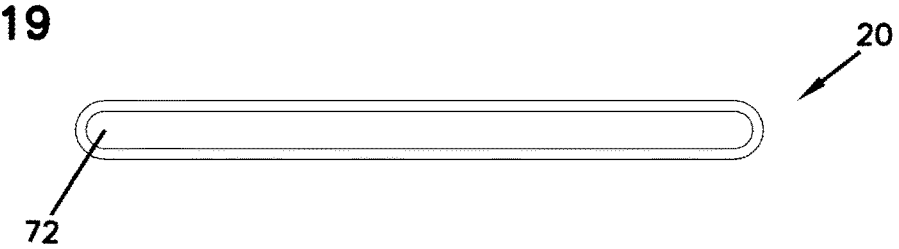
FIG. 19 is a bottom view of the filter element of FIG. 17.

In FIGS. 15-16, the inner core 200 is metal. In some example embodiments of FIGS. 15-16, the inner core is either a perforated or expanded metal liner 204.

At opposite ends of the filter element 20 in FIGS. 13-16 are end caps 72, 74. As with the other embodiments, the support structure 80, depicted as inner core 200, is secured to the second end cap 74. In these embodiments, the inner core 200 is unsecured and free of the first end cap 72. The inner core 200 is encapsulated and fixed within the second end cap 74 and extends less than a full extension of a length of the filter element 20 (between end caps 72, 74) to the first end cap 72. In this embodiment, there is a space or gap 78 between a free end 81 of the inner core 200 and the first end cap 72. The space or gap 78 is an open volume that is support structure-free. The inner core 200 is spaced a distance less than 50%, typically less than 25%, and often less than 10% from the first end cap 72 of the full extension between the first end cap 72 and second end cap 74.

Figure 20:
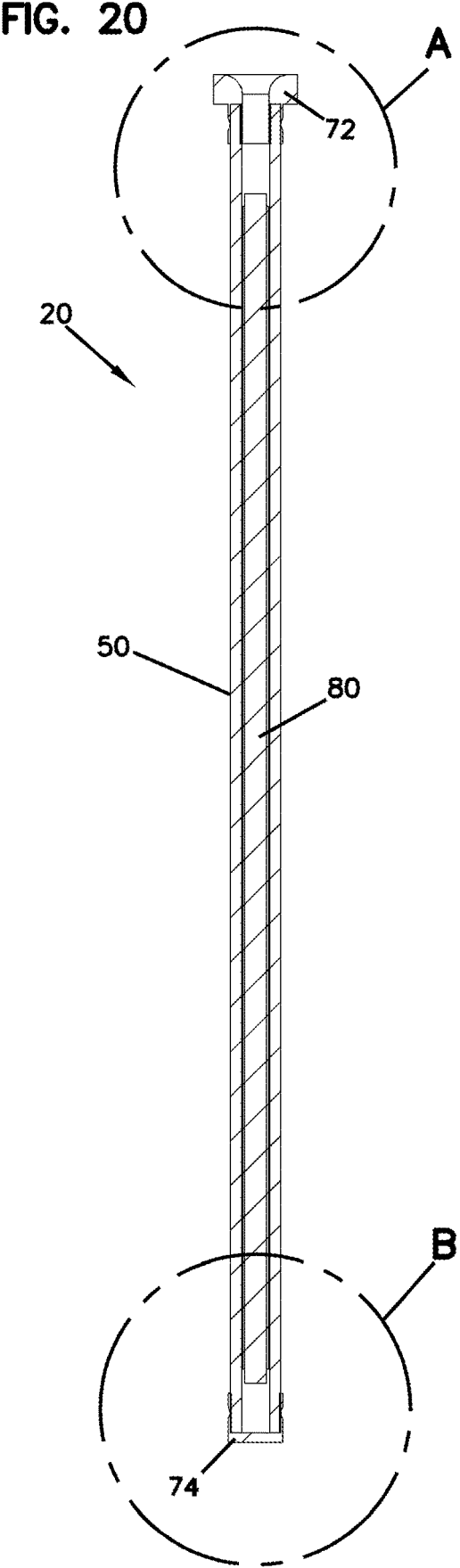
FIG. 20 is a cross-sectional view of the filter element of FIG. 17, the cross-section being taken along the line 20-20 of FIG. 17.
Figure 21:
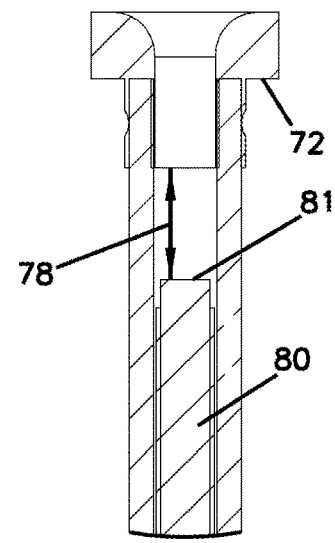
FIG. 21 is an enlarged view of an upper section of the cross-section of FIG. 20, the section being shown at A in FIG. 20.
Figure 22:
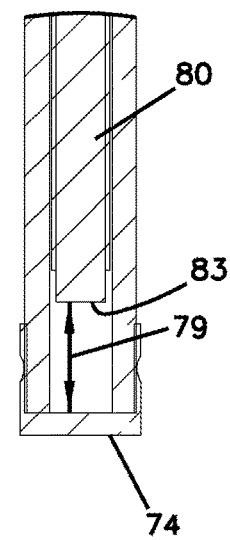
FIG. 22 is an enlarged view of a bottom section of the filter element of FIG. 20, the section being shown at B in FIG. 20.

FIGS. 17-22 depict another embodiment of filter element 20. In this embodiment, the support structure 80 is unsecured to and is free of both the first end cap 72 and the second end cap 74. As can be seen in FIGS. 20-22, the support structure 80 is spaced by space or gap 78 between free end 81 of the support structure 80 and the first end cap 72; as well as a space or gap 79 between a free end 83 of the support structure 80 and the second end cap 74.

FIGS. 24-44 depict a variance in embodiments that incorporate a rail system 300 therein. The rail system 300 will act similar to a linear bearing, to provide linear support to the filter elements 20 and prevent axial twist and filter sway, but while allowing for movement of the pleated media 50 during pulsing to prevent damage to the element 20, allow for pulse cleaning of the element 20, and lead to longer element life.

In the embodiment of FIGS. 24-28, the rail system 300 of the filter element 20 includes at least a first rail 302. The first rail 302 is fixed to the first end cap 72 at/or adjacent to a first end 303 of the first rail 302. The first rail 302 is positioned through the second end cap 74. In many advantageous embodiments, the first rail 302 slidably extends through the second end cap 74. The first rail 302 slidably extends through the second end cap 74 such that a second free end 305 of the first rail 302 is outside of the second end cap 74 at a position projecting away from a remaining portion of the filter element 20.

Still in reference to the embodiment of FIGS. 23-28, in some embodiments, the rail system 300 can also include a second rail 304. The second rail 304 is spaced from the first rail 302. The second rail 304 is fixed to the first end cap 72 at/or near a first end 306 and it slidably extends through the second end cap 74. The second rail 304 has a second end 307 that is exterior of the second end cap 74 and is projecting or extending in a direction away from a remaining portion of the filter element 20.

Figure 23:
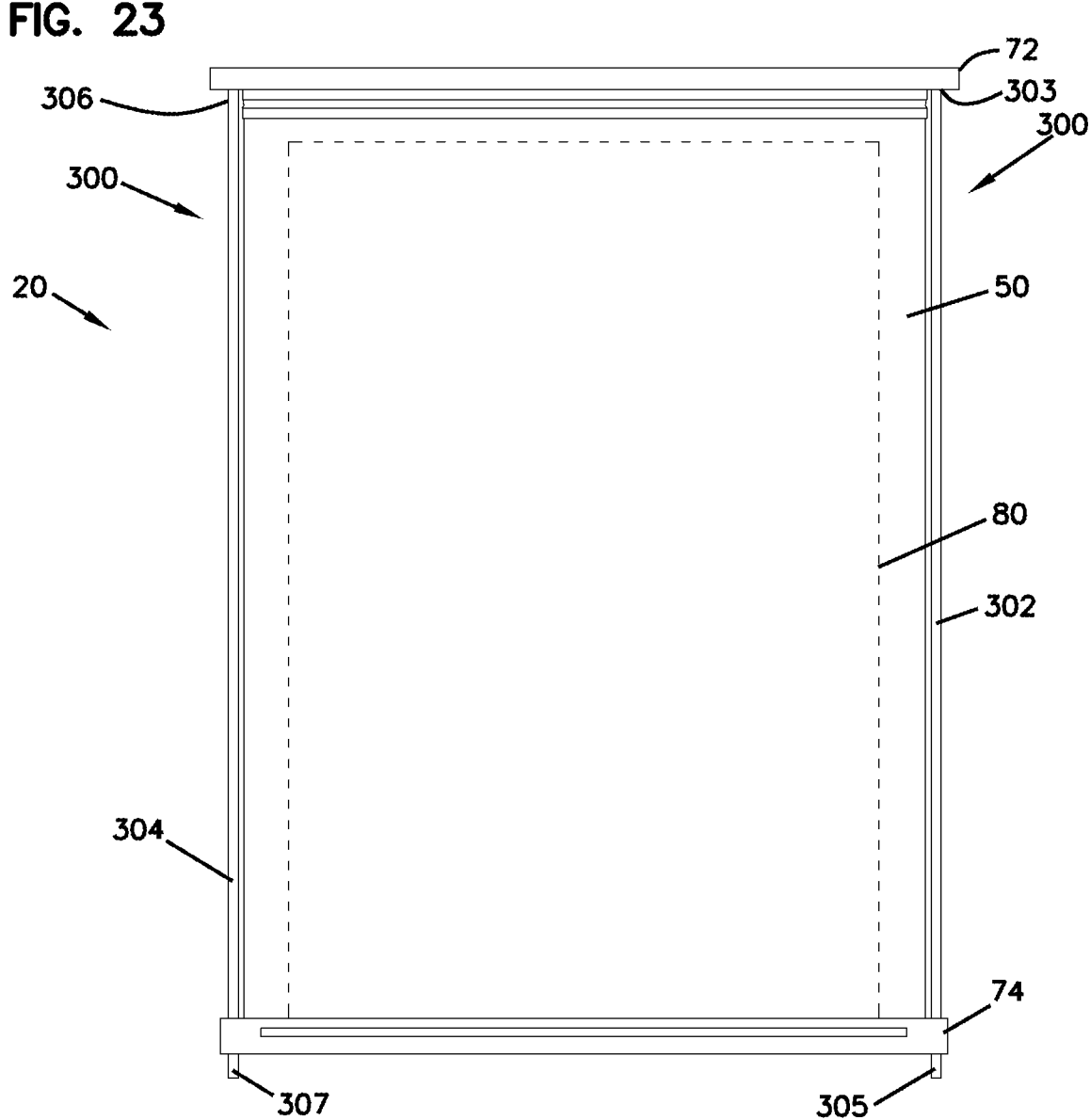
FIG. 23 is a front view of another embodiment of a filter element according to aspects of this disclosure.
Figure 24:
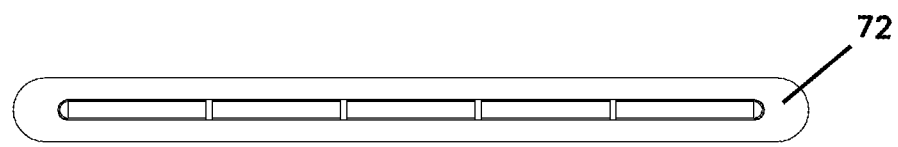
FIG. 24 is a top view of the filter element of FIG. 23.
Figure 25:
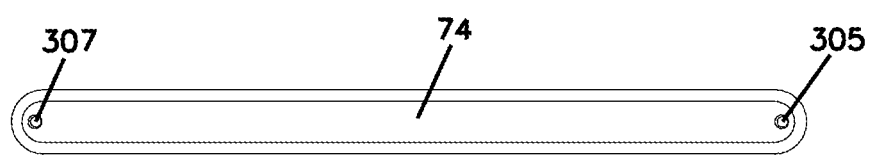
FIG. 25 is a bottom view of the filter element of FIG. 23.
Figure 29:
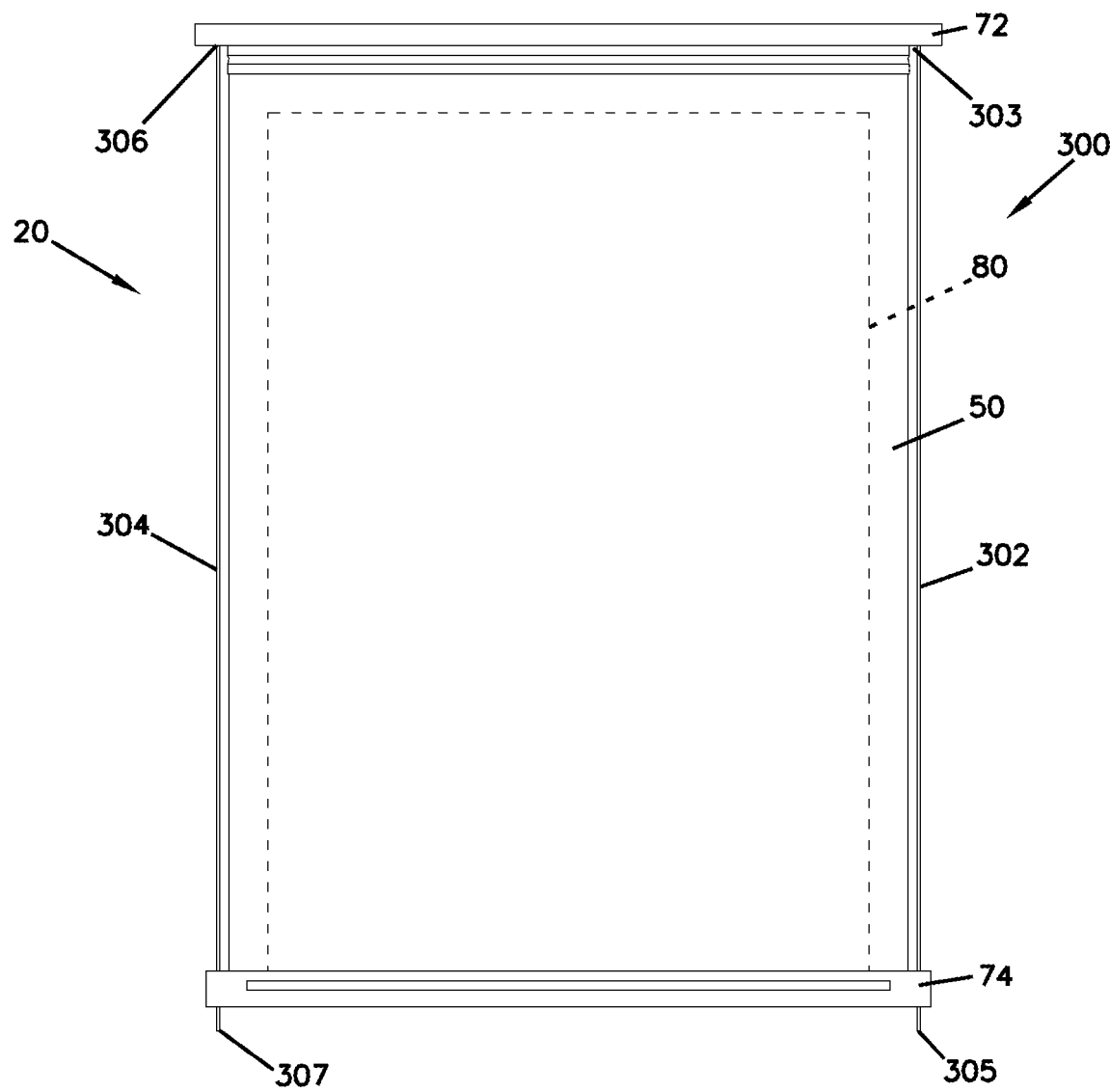
FIG. 29 is a front view of another embodiment of a filter element according to aspects of this disclosure.
Figure 30:
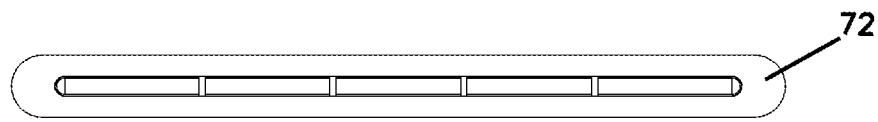
FIG. 30 is a top view of the filter element of FIG. 29.
Figure 31:
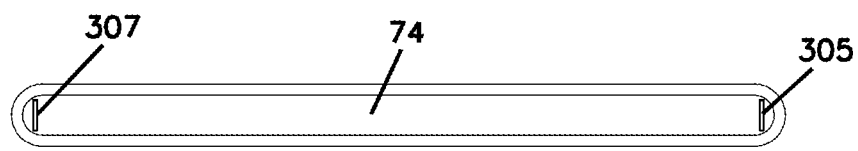
FIG. 31 is a bottom view of the filter element of FIG. 29.
Figure 38:
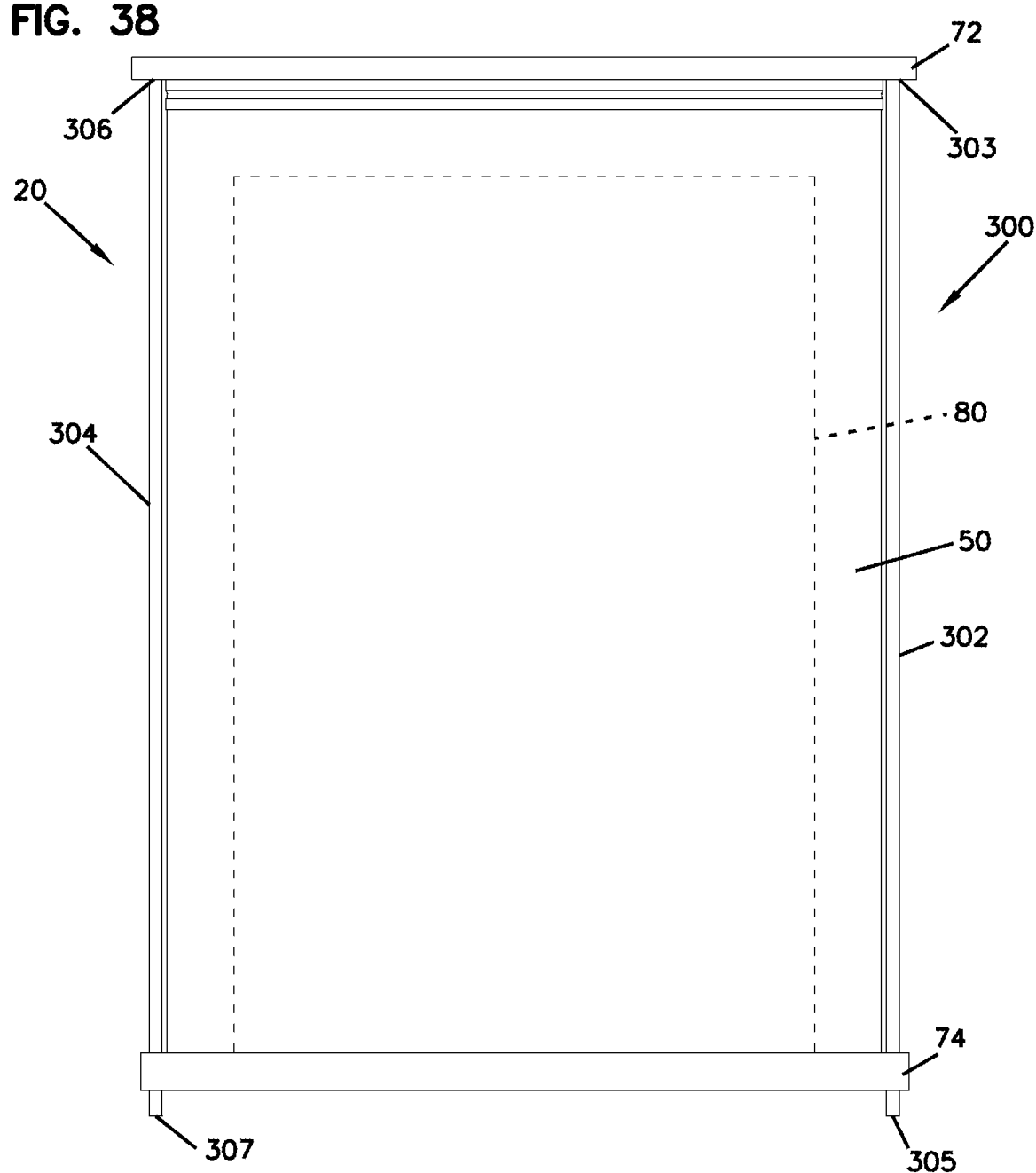
FIG. 38 is a front view of another filter element according to aspects of this disclosure.
Figure 39:
FIG. 39 is a top view of the filter element of FIG. 38.
Figure 40:
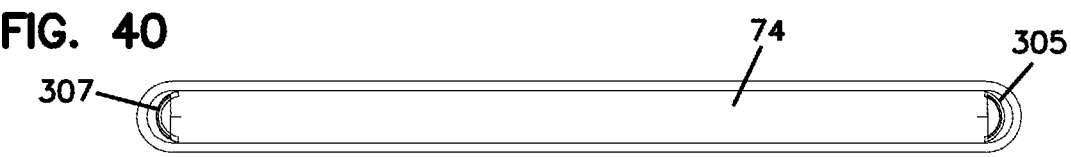
FIG. 40 is a bottom view of the filter element of FIG. 38.

In the embodiment of FIG. 23, it can be seen how the first rail 302 and second rail 305 are located exterior of the construction of pleated media 50. In the embodiment shown in FIG. 23, first rail 302 and second rail 304 are on opposite portions of the filter element 20. Specifically, in the racetrack shaped embodiment of FIG. 23, the first rail 302 and second rail 304 are on opposite semi-circle ends of the element 20. This can be seen in FIG. 25, in that the bottom end cap 74 is visible with first rail 302 projecting through the end cap 74 at the semi-circle end such that the end 305 of the rail 302 can be seen. The end 307 of the second rail 304 is visible projecting through the end cap 74 at the opposite semi-circle end.

FIG. 27 shows a front view of each one of the rails 302, 304, each being identical in appearance. A top view of the rails 302, 304 is shown in FIG. 28. In this embodiment, the rails 302, 304 have a round cross-section.

Figure 9:
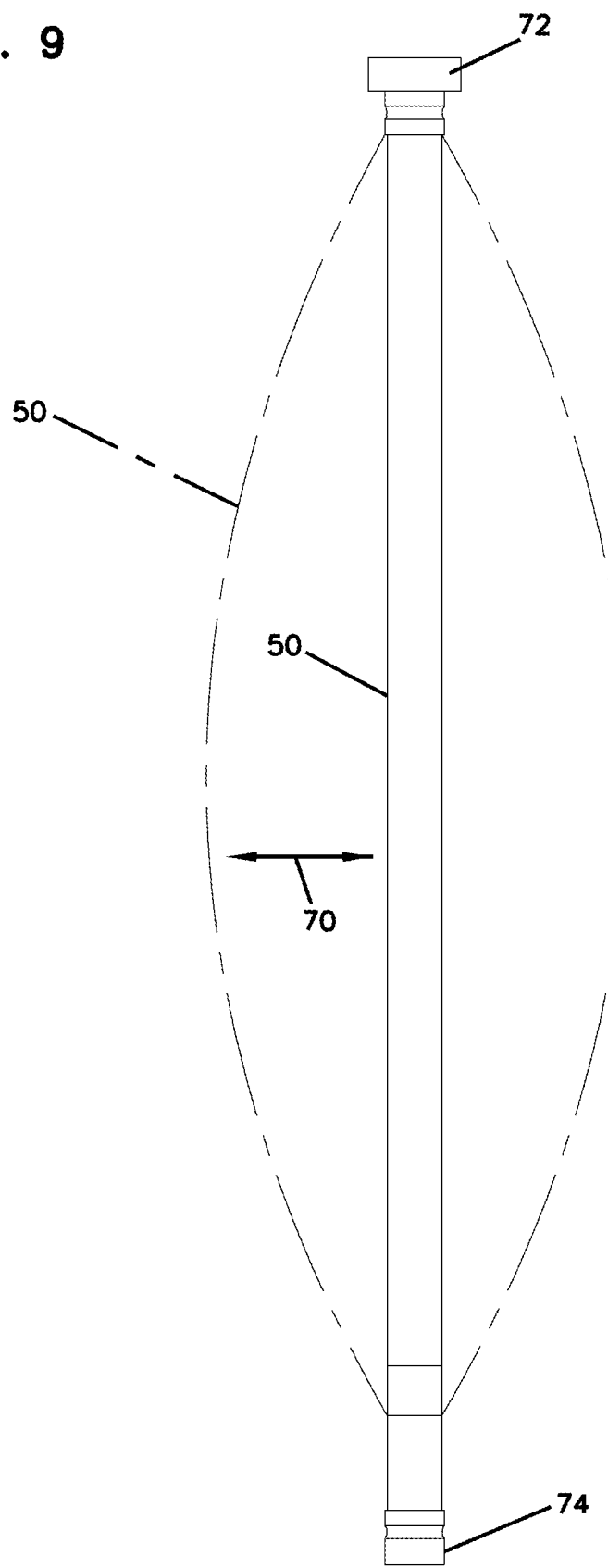
FIG. 9 is a schematic side view of the filter element of FIG. 2 while being pulse-cleaned in the dust collector of FIG. 1.

When the element 20 of FIGS. 23-28 is pulse cleaned, the pleated media 50 expands as shown in FIG. 9, and the second end cap 74 is allowed to slide linearly along the first and second rails 302, 304. The element 20 of FIG. 23 further includes inner support structure 80, shown in hidden lines in FIG. 23, and can be any of the previous embodiments of support structure 80 described above, and whose descriptions are not repeated herein.

In the embodiment of FIGS. 29-34, the element 20 also includes the rail system 300 as depicted in FIGS. 23-28. The description is not repeated herein. In this embodiment, the rails 302, 304 have a rectangular cross-section as shown in FIG. 34.

In the embodiment of FIGS. 35-37, the filter element of FIG. 11, in which the support structure 80 has first section 82 secured to the first end cap 72 and second section 84 secured to the second end cap 74 also includes first and second rails 302, 304, as described above. The filter element 20 in FIGS. 35-37 is free of support structure in the support structure-free region 86 that is located axially between the first section 82 and second section 84. The rails 302, 304 are secured to the first end cap 72, as described above, and extend through to be slidably within the second end cap 74. The rails 302, 304 can have a round, rectangular, or curved cross-section.

Figure 43:
FIG. 43 is a side view of the rail of FIG. 42.
Figure 42:
FIG. 42 is a front view of one of the rails used in the filter element of FIGS. 38-41.
Figure 41:
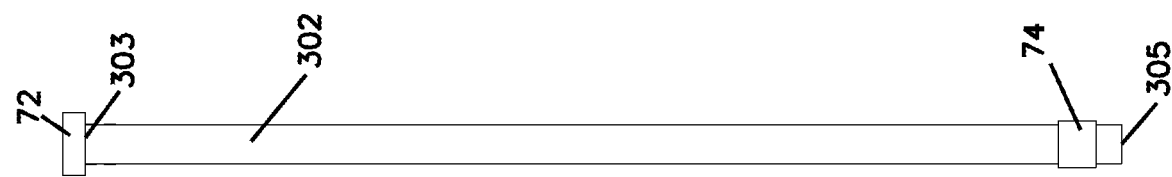
FIG. 41 is a side view of the filter element of FIG. 38.
Figure 44:
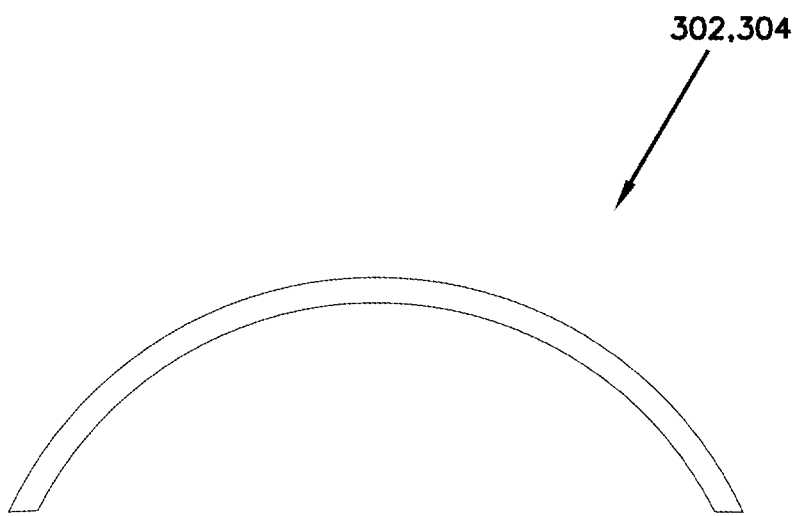
FIG. 44 is a top view of the rail of FIGS. 42 and 43.

In the embodiment of FIGS. 38-44, the filter element 20 also includes rail system 300 having first rail 302 and second rail 304, as previously described. The element 20, including the inner support structure 80 is also as earlier described. In this embodiment, the first and second rails 302, 304 have a curved cross-section, as can be seen in FIG. 44. FIG. 42 is a front view of the rails 302, 304, while FIG. 43 is a side view of the rails 302, 304 in this embodiment.

C. Methods

The elements 20 are useable in a method of filtering. A dust collector, such as collector 10, is provided. Dirty air will flow through the dirty air inlet 14, into the dirty air plenum 18, and then flow through at least one of the filter elements 20. The filter elements 20 will filter or remove dirt and particulate from the air, when the air flows from the upstream side to the downstream side of the pleated media 50. The clean filtered air will flow through a downstream side of the pleated media 50, through the opening 73 of the open end cap 72, and into the clean air plenum 22, before exiting the dust collector 10 through the clean air outlet 26.

The filter elements 20 will be periodically cleaned by emitting a pulse of compressed gas or air from the nozzles 38 and into the filter elements 20 by flowing through the open end cap 72 and into the filter interior 54. The air pulse will then flow from the downstream side of the media 50, through the media 50, and to the upstream side of the media 50. This will cause the pleated media 50 to expand, such as by bowing radially outwardly, and the overall element length to contract axially. After the pulse, the element 20 will return to its normal, filtering shape. The action of pulsing and allowing the element to change shape contributes to removing dust from the filter element and cleaning the element 20, without damaging the element 20.

The above represents example principles. Many embodiments can be made applying these principles.

What is claimed is:

1. A method of installing a filter element into a dust collector; the dust collector including a housing having a dirty air inlet, a dirty air plenum, a clean air outlet, and clean air plenum, and a tubesheet separating the dirty air plenum from the clean air plenum; the method comprising:
    (a) mounting a filter element in the dirty air plenum against the tubesheet; the filter element including:
        (i) a construction of pleated filter media defining an interior volume, the pleated media being free of restrictions along an outer portion;
            (A) the pleated media being constructed and arranged to bow outwardly during pulse cleaning;
        (ii) first and second opposite end caps molded or potted to opposite ends of the filter media;
            (A) the first end cap being an open end cap in communication with the interior volume;
            (B) the second end cap being a closed end cap; and
        (iii) a support structure supporting the filter media operably oriented in the interior volume; the support structure extending less than a full extension between the first end cap and second end cap and less than a full extension of the filter media; and
    (b) forming a seal between the first end cap and the tubesheet.

2. The method of claim 1 wherein the filter element includes at least a first rail fixed to the first end cap and slidably extending through the second end cap.

3. The method of claim 2 wherein the filter element includes a second rail, spaced from the first rail, fixed to the first end cap and slidably extending through the second end cap.

4. The method of claim 2 wherein the support structure includes a first section secured to the first end cap, a second section secured to the second end cap, and the element is free of support structure in a region between the first section and second section.

5. The method of claim 1 wherein the support structure is a construction comprising a plurality of spaced columns connected together with a plurality of cross braces.

6. The method of claim 5 wherein the columns are porous.

7. The method of claim 5 wherein the columns are hollow cylinders.

8. The method of claim 5 wherein there are no more than two columns.

9. The method of claim 5 wherein the cross-braces are perpendicular to the columns.

10. The method of claim 5 wherein there are eight cross-braces.

11. The method of claim 1 wherein the support structure comprises a pleated construction.

12. The method of claim 11 wherein the pleated construction has pleats extending about parallel to the direction of pleats of the pleated filter media.

13. The method of claim 11 wherein the pleated construction comprises a semi-rigid pleated screen.

14. The method of claim 11 wherein the pleated construction includes a perforated facing on opposite sides thereof.

15. The method of claim 1 wherein the pleated filter media is racetrack shaped, having a pair of parallel sides joined by a pair of rounded ends.

16. The method of claim 1 wherein the pleated filter media is cylindrical in shape with a circular cross-section.

17. The method of claim 1 wherein the pleated media is attachment-free relative to the support structure.

18. The method of claim 1 wherein the filter element is free of inner and outer liners.

19. The method of claim 1 wherein the support structure comprises an extruded construction.

20. The method of claim 1 wherein the support structure comprises a plastic construction.

21. The method of claim 1 wherein a length of the filter element between the first and second end caps is at least 20 inches and no greater than 100 inches.

* * * * *